(12) United States Patent
Higley et al.

(10) Patent No.: US 12,061,362 B2
(45) Date of Patent: Aug. 13, 2024

(54) HOUSING FOR A FIBER OPTIC CONNECTOR

(71) Applicant: US Conec Ltd., Hickory, NC (US)

(72) Inventors: Jason Higley, Hickory, NC (US); Darrell R. Childers, Hickory, NC (US); Craig M. Conrad, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/918,067

(22) PCT Filed: Apr. 23, 2021

(86) PCT No.: PCT/US2021/028929
§ 371 (c)(1),
(2) Date: Oct. 10, 2022

(87) PCT Pub. No.: WO2021/217057
PCT Pub. Date: Oct. 28, 2021

(65) Prior Publication Data
US 2023/0161116 A1     May 25, 2023

Related U.S. Application Data

(60) Provisional application No. 63/047,657, filed on Jul. 2, 2020, provisional application No. 63/014,491, filed on Apr. 23, 2020.

(51) Int. Cl.
*G02B 6/38* (2006.01)
(52) U.S. Cl.
CPC ......... *G02B 6/3821* (2013.01); *G02B 6/3831* (2013.01); *G02B 6/3857* (2013.01); *G02B 6/3869* (2013.01); *G02B 6/387* (2013.01); *G02B 6/3885* (2013.01)

(58) Field of Classification Search
CPC .. G02B 6/3821; G02B 6/3831; G02B 6/3857; G02B 6/3869; G02B 6/387; G02B 6/3885
See application file for complete search history.

(56) References Cited

U.S. PATENT DOCUMENTS

| 6,154,597 | A | 11/2000 | Roth |
| 9,933,582 | B1 * | 4/2018 | Lin ..................... G02B 6/3893 |
| 2015/0331202 | A1 | 11/2015 | Rosson |
| 2021/0149124 | A1 | 5/2021 | Higley et al. |

FOREIGN PATENT DOCUMENTS

WO    2021217050 A1    10/2021

OTHER PUBLICATIONS

PCT International search Report; Jul. 23, 2021; 4 pages.
Written Opinion PCT; Jul. 23, 2021; 8 pages.

* cited by examiner

Primary Examiner — Michael P Mooney
(74) Attorney, Agent, or Firm — Michael L Leetzow PLLC; Shubhrangshu Sengupta

(57) ABSTRACT

A housing for a fiber optic connector includes an opening extending between a front end and a rear end, and having an integral spring stop surface between the front end and the rear end. A front section receives an elastic member into the opening from the front end and the elastic member is engageable with the integral spring stop of the housing. There is a middle section of the main body to transition optical fibers between a fiber optic ferrule and a fiber optic cable. A rear section of the main body has an outer surface to engage a crimp ring.

13 Claims, 32 Drawing Sheets

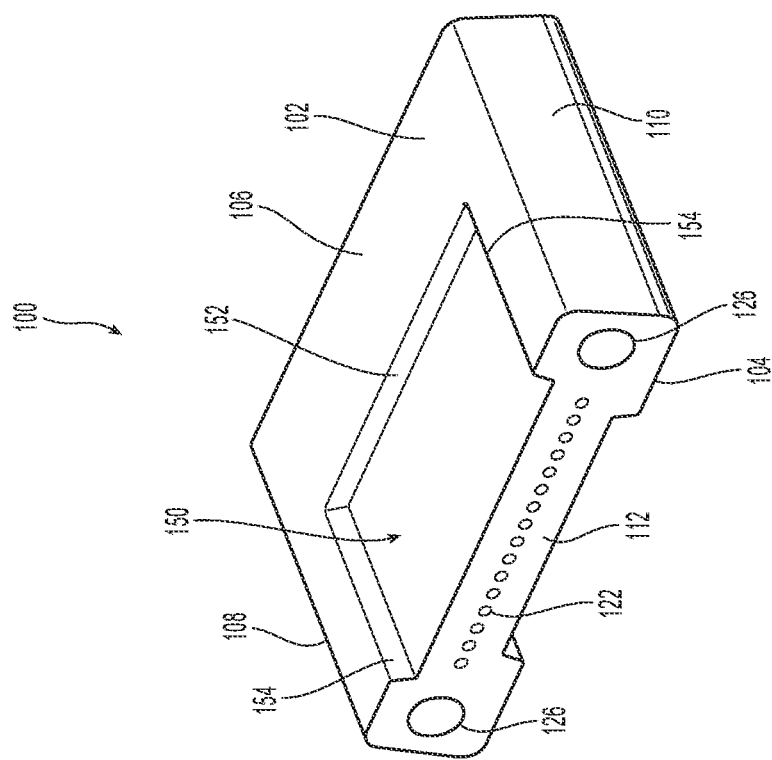
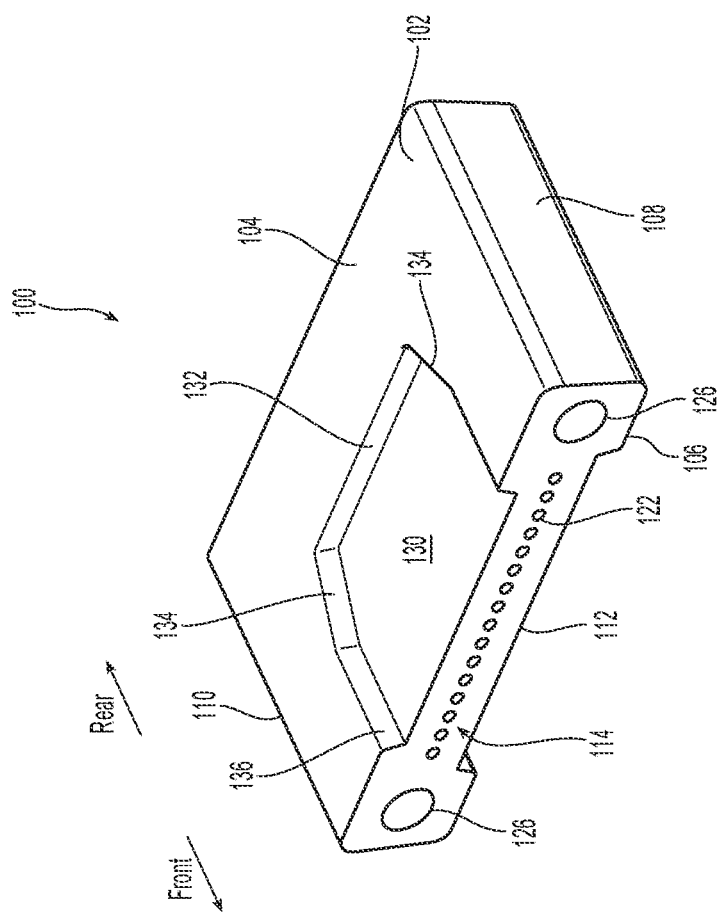

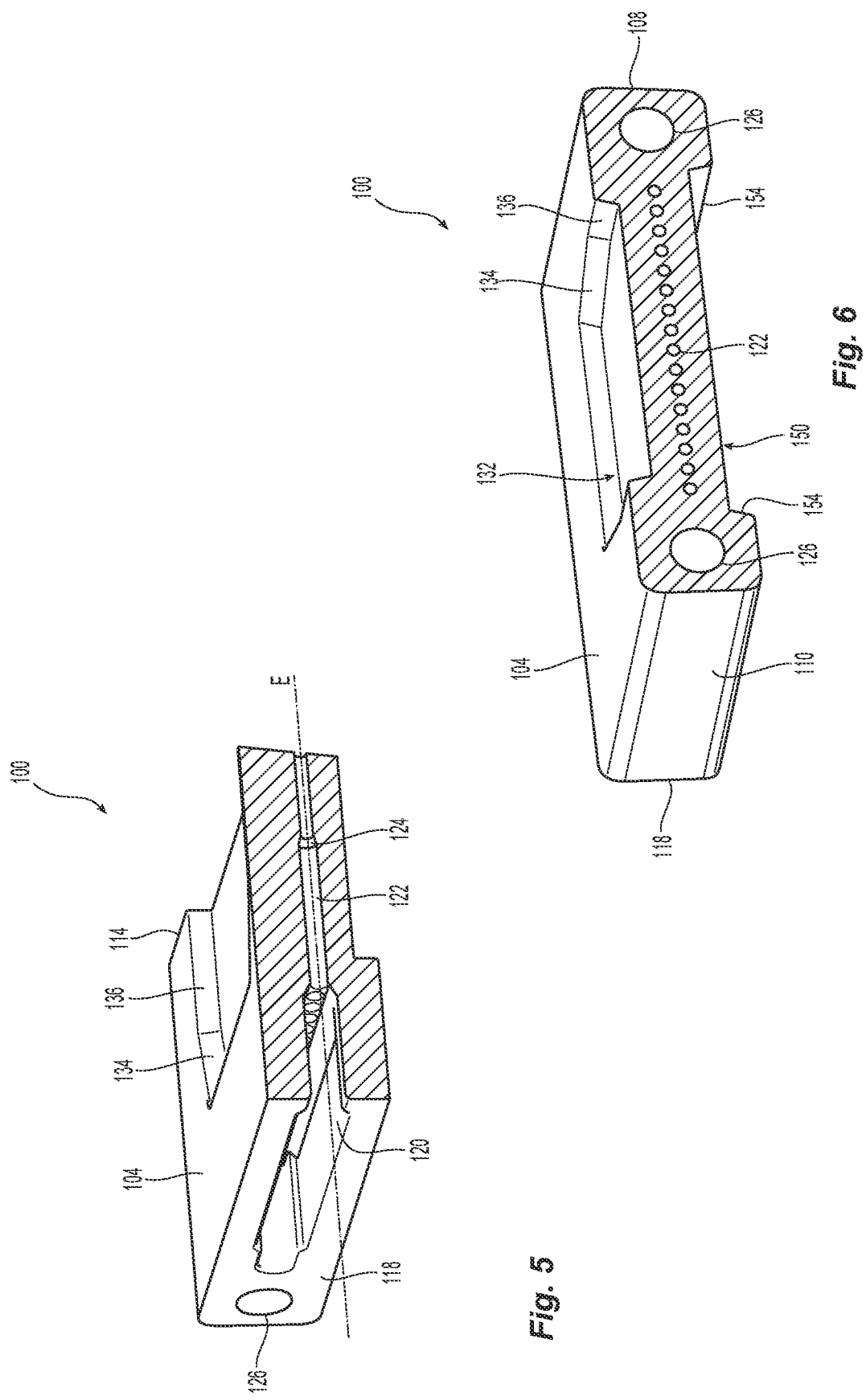

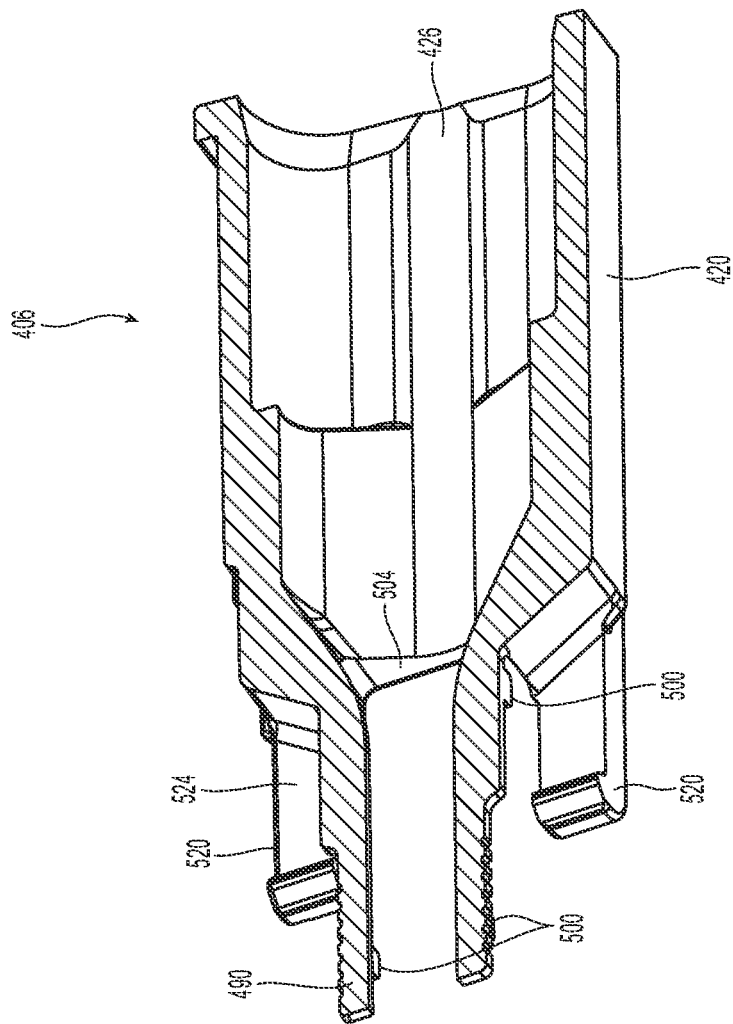
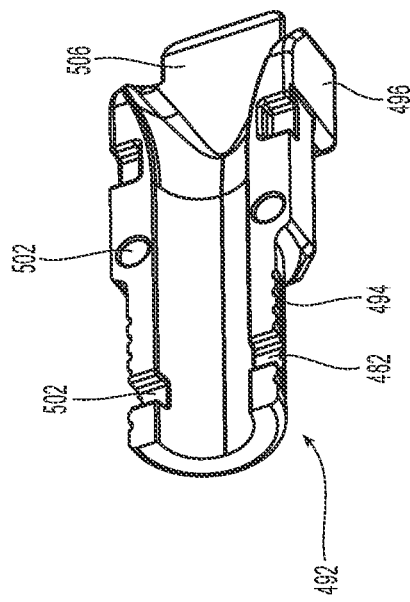
Fig. 24

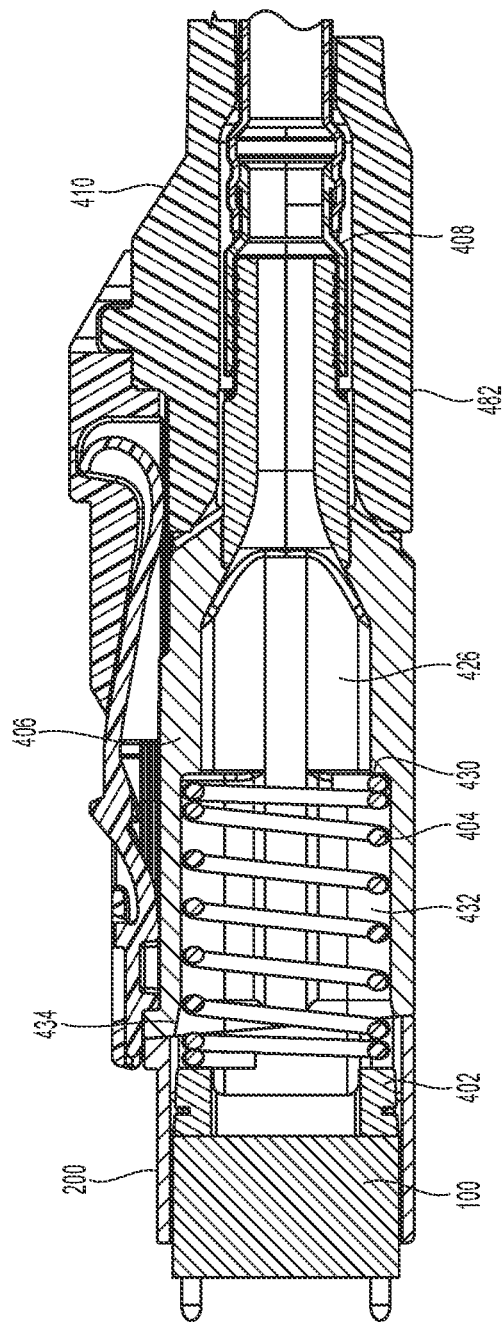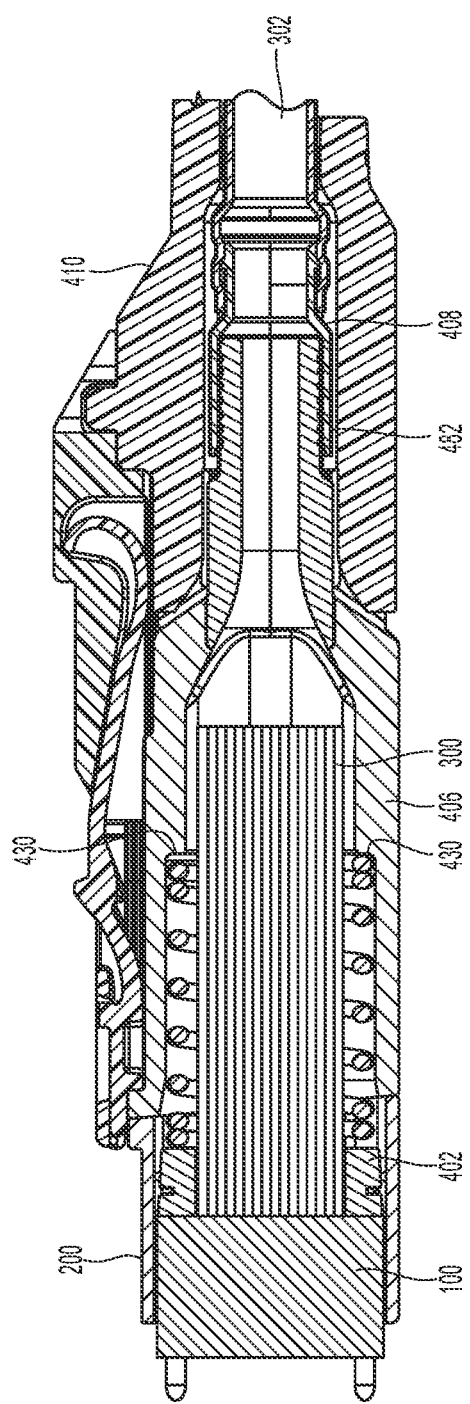

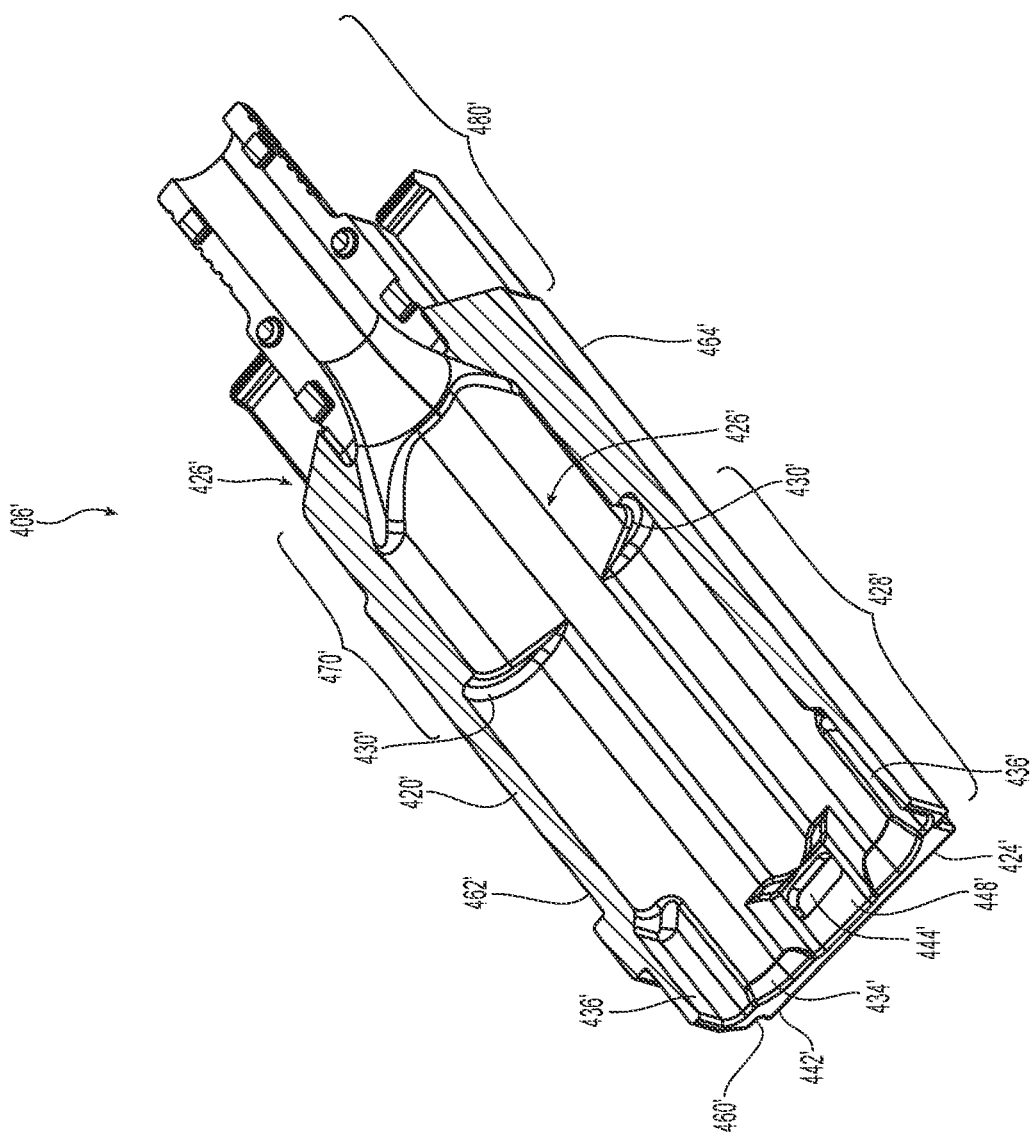
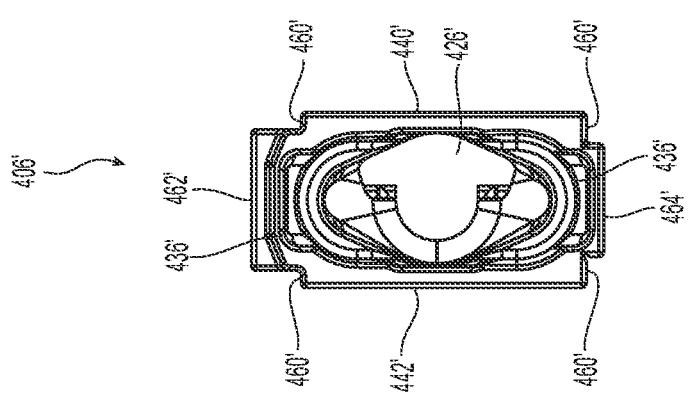
Fig. 31
Fig. 30

HOUSING FOR A FIBER OPTIC CONNECTOR

REFERENCE TO RELATED CASE

This application claims priority under 35 U.S.C. § 119 (e) to U.S. provisional application No. 63/014,491 filed on Apr. 23, 2020, and to U.S. provisional application No. 63/047,657 filed on Jul. 2, 2020, the contents of which are hereby incorporated by reference in their entirety.

BACKGROUND OF THE INVENTION

Transceivers interface with various duplex LC connectors with one optical link for the transmitter and another for the receiver. Duplex LC connectors are also used in non-transceiver interfaces, which have tight space requirements. Many such LC duplex connectors interface with transceivers having a footprint according to various industry multisource agreements (MSAs). Two of these include the Quad Small Form-factor Pluggable (QSFP) or the Small Form-factor Pluggable (SFP) MSAs and are defined by specifications associated with these MSAs. These connectors are used in communications applications with speeds up to 400 GBps, with higher speeds currently in research and development. One such duplex connector with a housing and a push-pull boot is illustrated in Applicant's WIPO patent application publication WO 2019/195652, filed Apr. 5, 2019.

By definition, duplex connectors can only accommodate two optical fiber ferrules (and hence, two optical fibers). This also provides a limitation on how many channels may be interfaced with the transceiver. Conventional non-duplex multi-fiber ferrules, such as the ubiquitous MT-ferrule, has a footprint that allows only one MT-ferrule to interface with the transceiver. For example, the MT-ferrule has shoulder(s) at the back that help the MT ferrule seat inside a typical MPO connector housing, in which the ferrule is used. The shoulder contributes to a larger footprint of the MT-ferrule that has a typical height of 3 mm, a length of 8 mm, and a width of 7 mm. Further, molding such ferrules to simply reduce the footprint is challenging with current multi-fiber ferrule designs. Accordingly, at this time, only one MT ferrule in an MPO connector housing footprint meets the space requirements of an SFP/QSFP footprint transceiver interface. Accordingly, Applicant provides a multi-fiber ferrule that allows for a plurality of duplex connector housings to fit in a footprint matching that of a QSFP/SFP footprint transceiver interface, and supporting more than two optical fibers (e.g., 16 optical fibers). As a result, two or more of such MT-like ferrules within respective housings can be interfaced with an SFP/QSFP transceiver interface.

In order to use the new higher density fiber optic ferrule, there needs to be a new housing that can receive the new fiber optic ferrule and mate to the transceiver or other assembly.

SUMMARY OF THE INVENTION

According to one aspect, the present invention is directed to a housing for a fiber optic connector that includes a main body with an opening extending between a front end and a rear end, a front section of the main body to receive an elastic member into the opening from the front end, a middle section of the main body to transition optical fibers between a fiber optic ferrule and a fiber optic cable, a rear section of the main body having an outer surface to engage a crimp ring.

In some embodiments, the rear section has a first portion and a second portion, the second portion removably attachable to the first portion and forms a cylindrical outer surface with the first portion.

In other embodiments, one of the first portion and the section portion have recesses and the other of the first portion and the second portion have extensions to engage the recesses.

In some embodiments, the front section of the main body has a forward facing end face, the forward facing end face being non-perpendicular to a longitudinal axis extending through the opening from the front end to the rear end.

In some embodiments, an outside surface of the main body has at least one depression to receive a portion of a fiber optic ferrule receiver therein.

In some embodiments, there is a plurality of latch arms extending from the main body in a rearward direction and away from the front end.

In some embodiments, the plurality of latch arms engage a portion of a push-pull boot.

In other embodiments, the second portion of the rear end creates asymmetric portion of the opening at the rear end.

In some embodiments, the rear section has a first portion and a second portion, the second portion removably attachable to the first portion and further comprising a latch arm that is attached to the second portion of the rear section.

In yet another aspect, there is a housing for a fiber optic connector that includes a main body with an opening extending between a front end and a rear end, and having an integral spring stop surface between the front end and the rear end, a front section of the main body to receive an elastic member into the opening from the front end and engageable with the integral spring stop of the housing, a middle section of the main body to transition optical fibers between a fiber optic ferrule and a fiber optic cable, a rear section of the main body having an outer surface to engage a crimp ring.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 1 is a top perspective view of one embodiment of a multi-fiber ferrule according to the present invention;

FIG. 2 is a bottom perspective view of the multi-fiber ferrule in FIG. 1;

FIG. 5 is a cross sectional view from the rear of the multi-fiber ferrule in FIG. 1;

FIG. 6 is a cross sectional view of the multi-fiber ferrule in FIG. 1;

FIG. 24 is an exploded view of a cross section of the housing of the fiber optic connector in FIG. 8 with the second portion on the left side;

FIG. 25 is an elevational view of a cross section of the fiber optic connector in FIG. 8 with a push-pull boot and connector latch installed thereon;

FIG. 26 an elevational view of a cross section of the fiber optic connector in FIG. 8 with a push-pull boot and connector latch installed thereon and at a different position within the connector;

FIG. 30 is a front elevational view of the housing in the fiber optic connector in FIG. 29;

FIG. 31 is a perspective view of a cross section of the housing in FIG. 30;

DETAILED DESCRIPTION OF THE INVENTION

Figure 3:
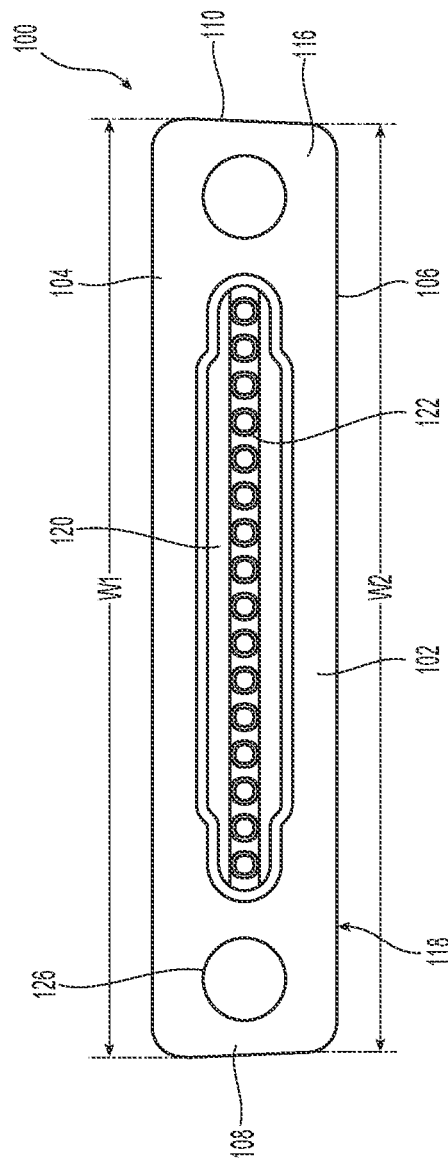
FIG. 3 is a rear elevational view of the multi-fiber ferrule in FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Illustrated in FIGS. 1-6 is one embodiment of a multi-fiber ferrule 100 according to the present invention. The multi-fiber ferrule 100 has a main body 102 having a top portion 104 and a bottom portion 106. There is a first side portion 108 that extends between the top portion 104 and the bottom portion 106. There is also a second side portion 110 extending between the top portion 104 and the bottom portion 106 on opposites sides of the main body 102. The main body 102 also has an end face 112 at a front end 114 of the main body 102 and a rear face 116 at a rear end 118 of the main body 102. The multi-fiber ferrule 100 is significantly smaller than the conventional MT —ferrule and has typical dimensions of 1.25 mm height, 4 mm length (between the front end 114 and the rear end 118), and a width of 6.4 mm between the first side portion 108 and the second side portion 110.

Figure 8:
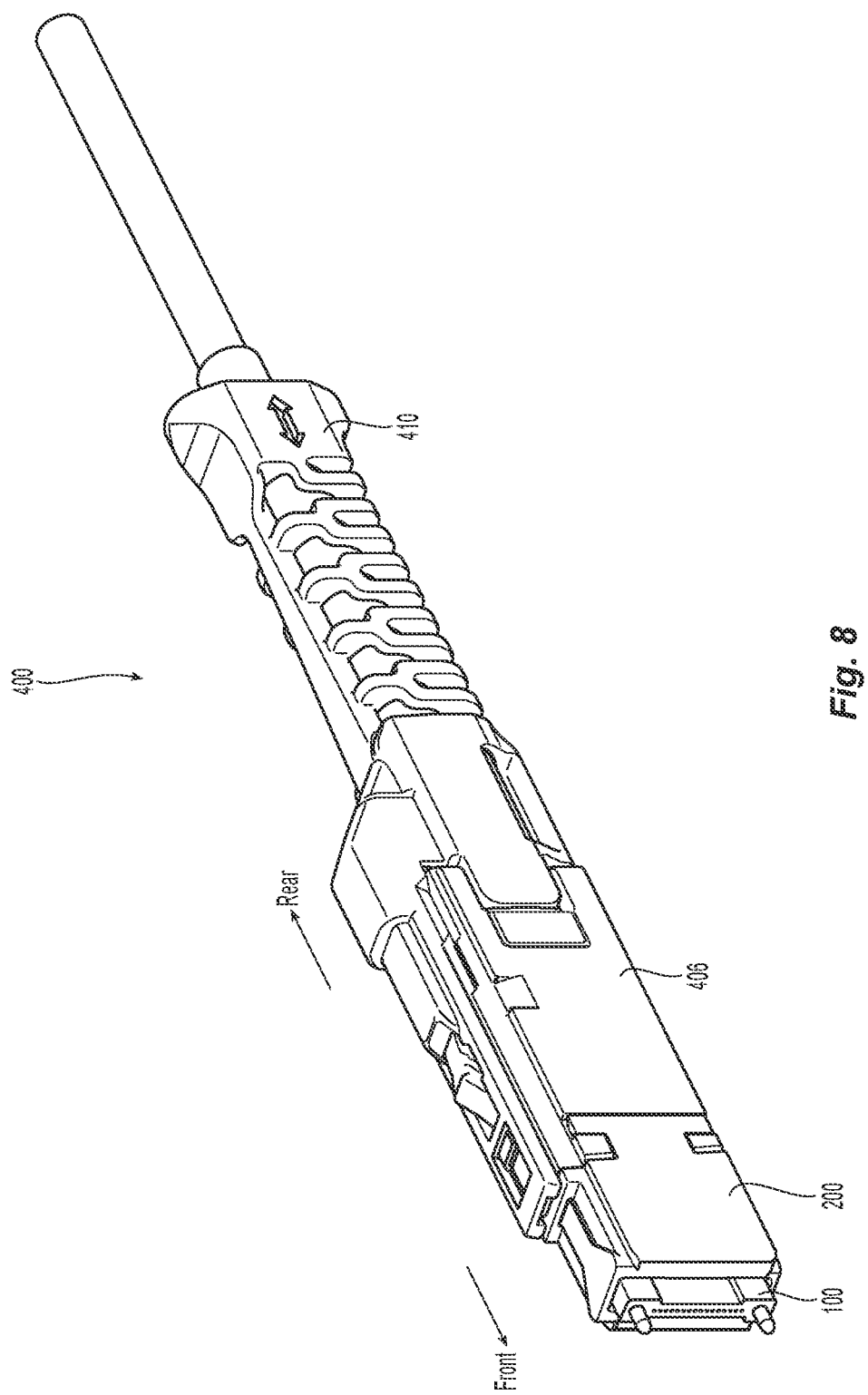
FIG. 8 is a perspective view of one embodiment of a fiber optic connector according to the present invention from the top left and using the multi-fiber ferrule in FIG. 1.

Applicant notes that the term "front" or "forward" means that direction where the fiber optic ferrule would meet with another fiber optic ferrule or device, while the term "rear" or "rearward" is used to mean the direction from which the optical fibers enter into the fiber-optic ferrule or fiber optic connector. In the present application, the multi-fiber ferrule and the fiber optic connector will therefore have a front and a rear, the front will be inserted into an adapter, sleeve or other receptacle. Thus, in FIG. 1, the "front" of the multi-fiber ferrule is on the left side of the figure and pointing out of the figure. The "rear" or "back" is that part of multi-fiber ferrule is on the right side of FIG. 1 and "rearward" and "backward" is toward the right and into the page. The same is true with the fiber optic connector as illustrated in FIG. 8—the front is to the left and out, while rear is to the right and back.

As seen in FIG. 3, the multi-fiber ferrule 100 has a rear central opening 120 extending into the main body 102 from the rear face 116 and configured to receive at least three optical fibers (not shown). The multi-fiber ferrule 100 also has a plurality of fiber support structures 122 to support the optical fibers. See also FIG. 5. The fiber support structures 122 are in communication with the rear central opening 120 and extending through the main body 102 to the end face 112. Along the length of the fiber support structures 122 there may be chamfered portions 124 that assist in insertion of the optical fibers into the multi-fiber ferrule 100 without the skiving of the front ends of the optical fibers. The fiber support structures 122 may be fiber openings or fiber bores, but may alternatively be groove structures, or the combination or both. The main body 102 may also include two guide pin holes 126, which extend between the end face 112 and the rear face 116. The guide pin holes 126 provide a reference point with respect to the main body 102 and other structures to which the multi-fiber ferrule 100 is mated. As noted below, the guide pin holes 126 are outside the area of cutouts to allow for enough material in the main body 102 to allow for the guide pin holes 126. The end face 112 may have a rectangular profile, although a trapezoidal profile (as shown) may also be provided as an alternative.

The top portion 104 has a top cut-out 130 that forms a first forward facing surface 132. The first forward facing surface 132 is used as a stop surface in conjunction with a housing for a connector, e.g., an SFP/QSFP connector. There may also be a number of other surfaces formed by the top cut-out 130. For example there is a second, slanted surface 134 on both sides of the top cut-out 130 that assist in the location of the multi-fiber ferrule 100 in the housing for a connector. The second, slanted surfaces 134 assist in moving the multi-fiber ferrule 100 in a side-to-side manner relative to the housing. There are also laterally facing surfaces 136 on each side that form the last part of the cut-out 130 and extend to the end face 112 from the second, slanted surfaces 134. As illustrated in the figures, the top cut-out 130 does not extend all of the way to the rear end 118, but stops short at the first forward facing surface 132. However, a portion of the top cut-out 130 could extend all the way to the back of the multi-fiber ferrule 100. For example, a cutout in the shape of a "T" with a thin narrow section going all the way to the back would work as well, as long as there is at least one forward facing surface adjacent to such a variation of the top cut-out 130. This applies to a bottom cut-out 150 as well, described below.

The top portion 104 has a first surface 140 that lies in a first plane A and the cut-out 130 forms a second surface 142 that lies in a second plane B. See FIG. 4. Planes A and B are preferably parallel to one another but off set, with plane B being closer to a longitudinal axis E passing through the center of the main body 102 and through the rear central opening 120 between the front end 114 and the rear end 118. See also FIG. 5. It should also be noted that the cut-out portion 130 does not extend into the rear central opening 120 or the fiber support structures 122.

Similarly, the bottom portion 104 has the bottom cut-out 150 that forms a second forward facing surface 152. The second forward facing surface 152 is also used as a stop surface in conjunction with a housing for a connector. The bottom cut-out 150 also has two laterally facing surfaces 154 that form a portion thereof. The bottom cut-out 150 extends from the end face 112 towards the rear end 118, but does not reach the rear end 118. It may reach the same distance toward the rear end 118 from the end face 112 as does the top cut-out 130, but it may stop short of or beyond where the top cut-out 130 stops at forward facing surface 132.

The bottom portion 104 has a first surface 160 that lies in a third plane C and the bottom cut-out 150 forms a fourth surface 162 that lies in a fourth plane D. See FIGS. 4 and 5. The Planes C and D are preferably parallel to one another but off set, with plane D being closer to the longitudinal axis E passing through the center of the main body 102 and through the rear central opening 120 between the front end 114 and the rear end 118. It should also be noted that the bottom cut-out 150 does not extend into the rear central opening 120 or the fiber support structures 122.

Figure 4:
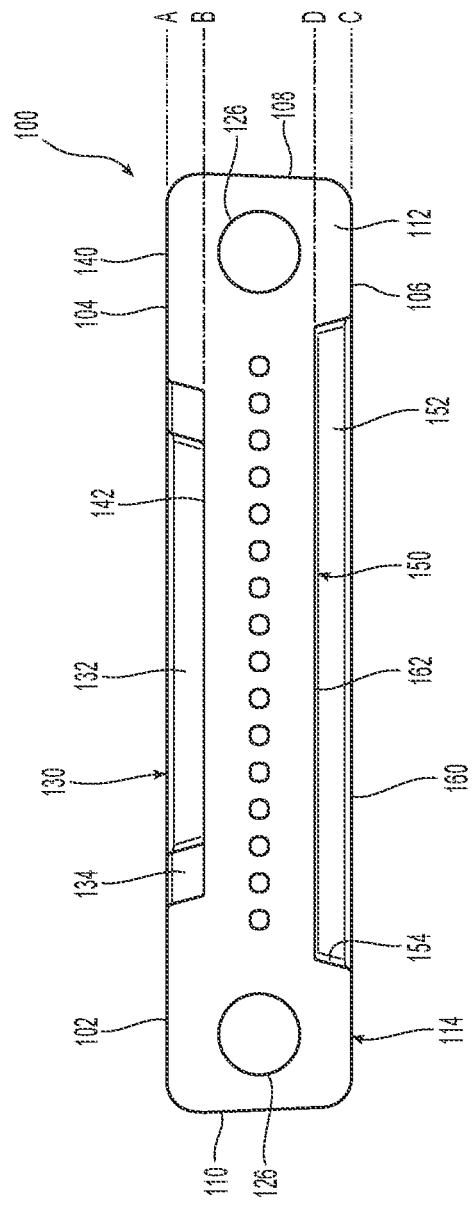
FIG. 4 is front elevational view of the multi-fiber ferrule in FIG. 1.

It should be noted that the thickness of the main body 102 varies across a width and a depth. As seen in FIGS. 4 and 6, the thickness of the main body 102 is least where the two cut-outs 130, 150 are located. This is seen in FIG. 4 and represented by the distance between planes B and D. The thickness of the main body 102 is greatest where there are no cut-outs, which corresponds to the distance between the planes A and C.

Returning to the main body 102, there is first side portion 108 that extends between the top portion 104 and the bottom portion 106. There is also a second side portion 110 extending between the top portion 104 and the bottom portion 106 on opposites sides of the main body 102. The first side portion 108 and the second side portion 110 are smooth between the front end 114 and the rear end 118. Additionally, there is no shoulder with multi-fiber ferrule 100 making the profile from the back to the front the same as the front to the back—and also the same at the end face 112 and the rear face 116. That is, the multi-fiber ferrule 100 is shoulder-less. The term shoulder-less referring to a lack of any protrusions or other features on the first side portion 108 and the second side portion 110 that may be used to engage the multi-fiber ferrule 100 with a receptacle or an adapter. There are also no sharp edges along the length of the multi-fiber ferrule 100 at the junction of the side portions 108,110 to the top and bottom portions 104,106. See, e.g., FIGS. 1 and 2. It should also be noted that the top portion 104 may be wider than the bottom portion. That is, the distance across the top portion 104 may be greater than the distance across the bottom portion 106 between the side portions. That is, W1 may be greater that W2 as illustrated in FIG. 3. Alternatively, W1 equals W2.

It should also be noted that the rear surface 116 at the rear end 118 may also be used as a reference surface for any work that may be done to the multi-fiber ferrule 100. For example, the rear surface 116 may be used as a reference surface for polishing the end face 112 of the main body 102. The use of the rear surface 116 is in addition to the first forward facing surface 132 and/or the second forward facing surface 152. Preferably, the wider of the first forward facing surface 132 and the second forward facing surface 152 would be used as a reference datum surface for polishing and interferometry. The end face 112 may be angle-polished (i.e., at an angle relative to the rear face 116). Alternatively, the end-face 112 may be flat polished. The top cut-out 130 may have a different width than the bottom cut-out 150. This may act as a polarity indication and/or may cause the ferrule to be oriented in a specific direction when received inside a receptacle or an adapter for mating with another ferrule. Alternatively, the top cut-out 130 may have a same width as the bottom cut-out 150.

Figure 7:
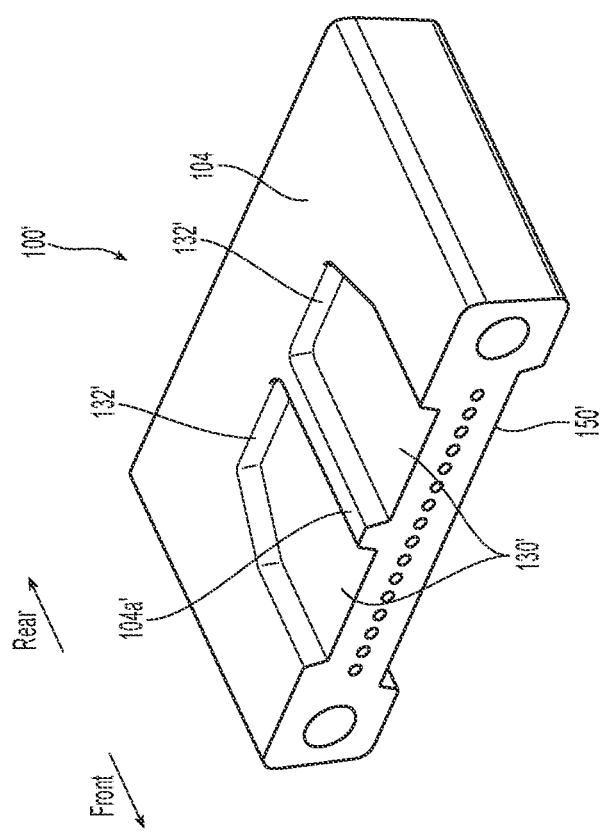
FIG. 7 is a front elevational view of the multi-fiber ferrule in FIG. 1.

An alternative embodiment of a multi-fiber ferrule 100' is illustrated in FIG. 7. In this embodiment, the top portion 104' has two top cut-outs 130' that form two first forward facing surfaces 132'. The two top cut-outs 130' are separated by a continuation 104a' of the top portion 104'. The continuation 104a' of the top portion 104' acts as a key for the a multi-fiber ferrule 100'. This is in addition to the top cut-out 130' having a different width that the bottom cut-out 150'. Thus the continuation 104a' may act as a polarity key or wedge. In an alternative aspect, the continuation 104a' may be presented only partially separate the two top cutouts 130'. Otherwise, the multi-fiber ferrule 100' is the same as noted above with regard to multi-fiber ferrule 100.

Figure 9:
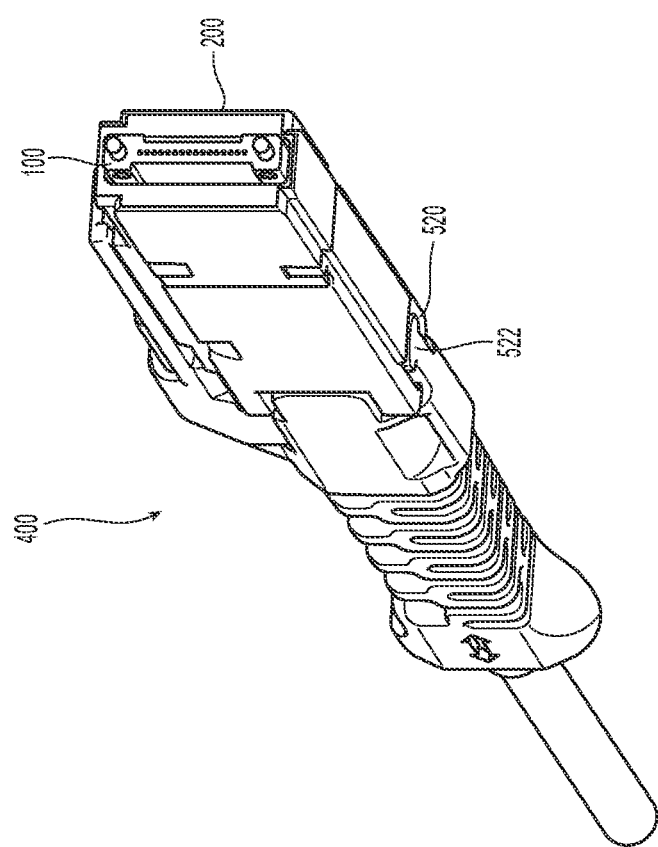
FIG. 9 is a perspective view of the fiber optic connector in FIG. 8 from the bottom right and using the multi-fiber ferrule in FIG. 1.

Moving to FIGS. 8-16, there is one embodiment of a fiber optic ferrule receiver 200 to receive a fiber optic ferrule 100 according to the present invention. The fiber optic ferrule receiver 200 can be used in a number of different connectors and assemblies. As illustrated in FIGS. 8 and 9, the fiber optic ferrule receiver 200 is a part of a fiber optic connector 400. Additionally and as discussed in more detail below, the elements of the fiber optic ferrule receiver 200 may be found in other receivers as well. For example, the features of the fiber optic ferrule receiver 200 may be included in an adapter, into which the fiber optic ferrule 100 would be directly inserted.

Figure 10:
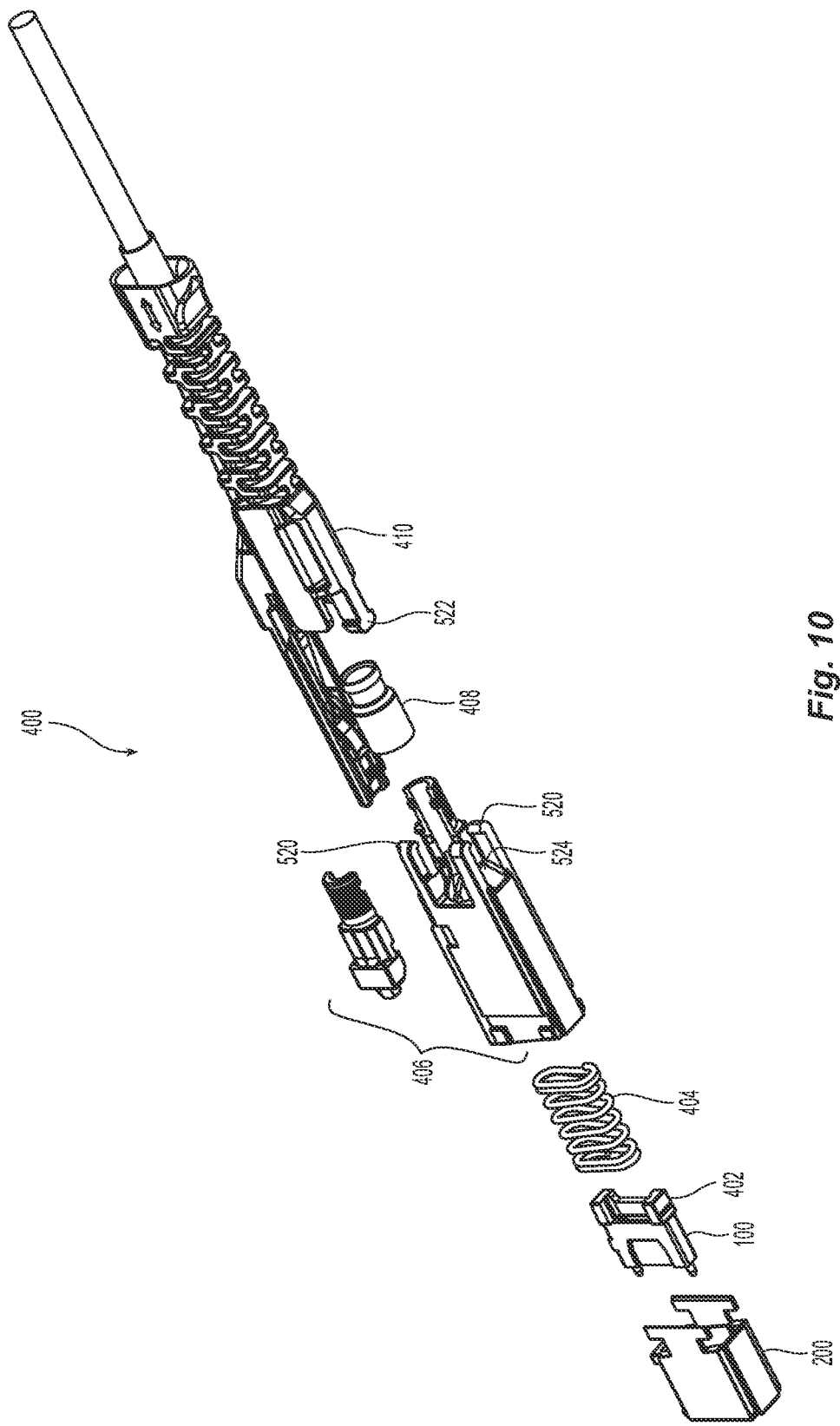
FIG. 10 is an exploded view of the fiber optic connector in FIG. 8.
Figure 11:
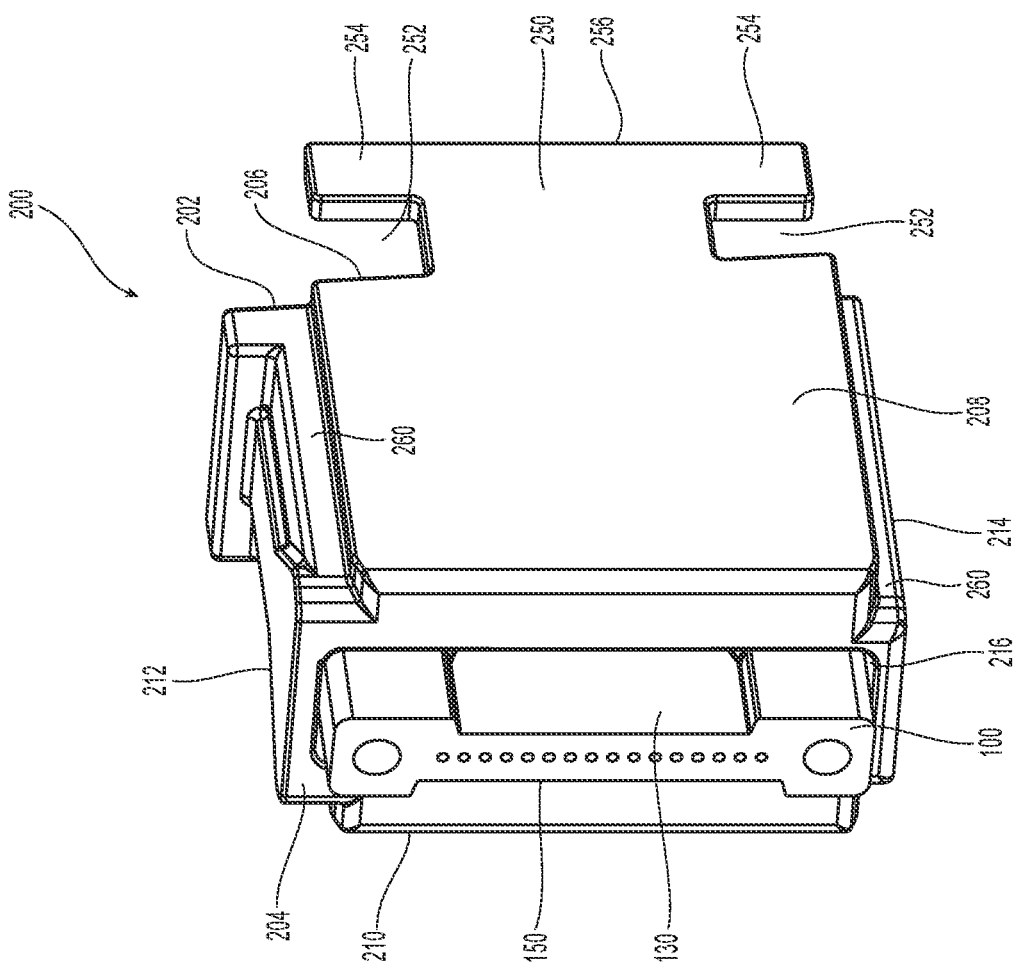
FIG. 11 is a left side perspective view of one embodiment of a fiber optic ferrule receiver/cap with the multi-fiber ferrule of FIG. 1 disposed therein.

Now turning to FIG. 10, the components of the fiber optic connector 400 will be described, moving in a front to rear direction (or left to right in the figure). The fiber optic ferrule receiver 200 is on the far left, with the multi-fiber ferrule 100 that will be inserted into the fiber optic ferrule receiver 200 next in line. While the multi-fiber ferrule 100 is illustrated, the invention may apply to other fiber optic ferrules as well. Behind the multi-fiber ferrule 100 is a guide pin keeper or spacer 402. A spring 404 (or other elastic element) is disposed in front end of a housing 406 (and is described in more detail below) to bias the multi-fiber ferrule 100 in a forward direction with the fiber optic ferrule receiver 200. A crimp ring 408 is used to secure the strength members associated with the optical fibers (not shown) to the housing 406. Finally, a push-pull boot 410 is attached to the housing 406.

The fiber optic ferrule receiver 200 includes a main body 202 extending between a front end 204 and a rear end 206. See FIGS. 11 and 12. The main body 202 has four sides 208,210,212,214, and an opening 216 extending between the front end 204 and the rear end 206 and being defined at least by a portion of internal surfaces of the four sides 208,210,212,214. As illustrated, the first side 208 and the second side 210 are on opposite sides of the opening 216, while the third side 212 and the fourth side 214 are each connected to the first side 208 and the second side 210 and are opposite each other about the opening 216. The third side 212 and the fourth side 214 have internal surfaces that are preferably flat and linear, but they may have tapering features like the internal surfaces of first side 208 and second side 210, discussed in detail below. In one aspect of this disclosure, the third side 212 may include a polarity step or a polarity mark to indicate orientation of the fiber optic ferrule receiver 200 and hence, the fiber optic ferrule 100. See also FIG. 13.

Figure 12:
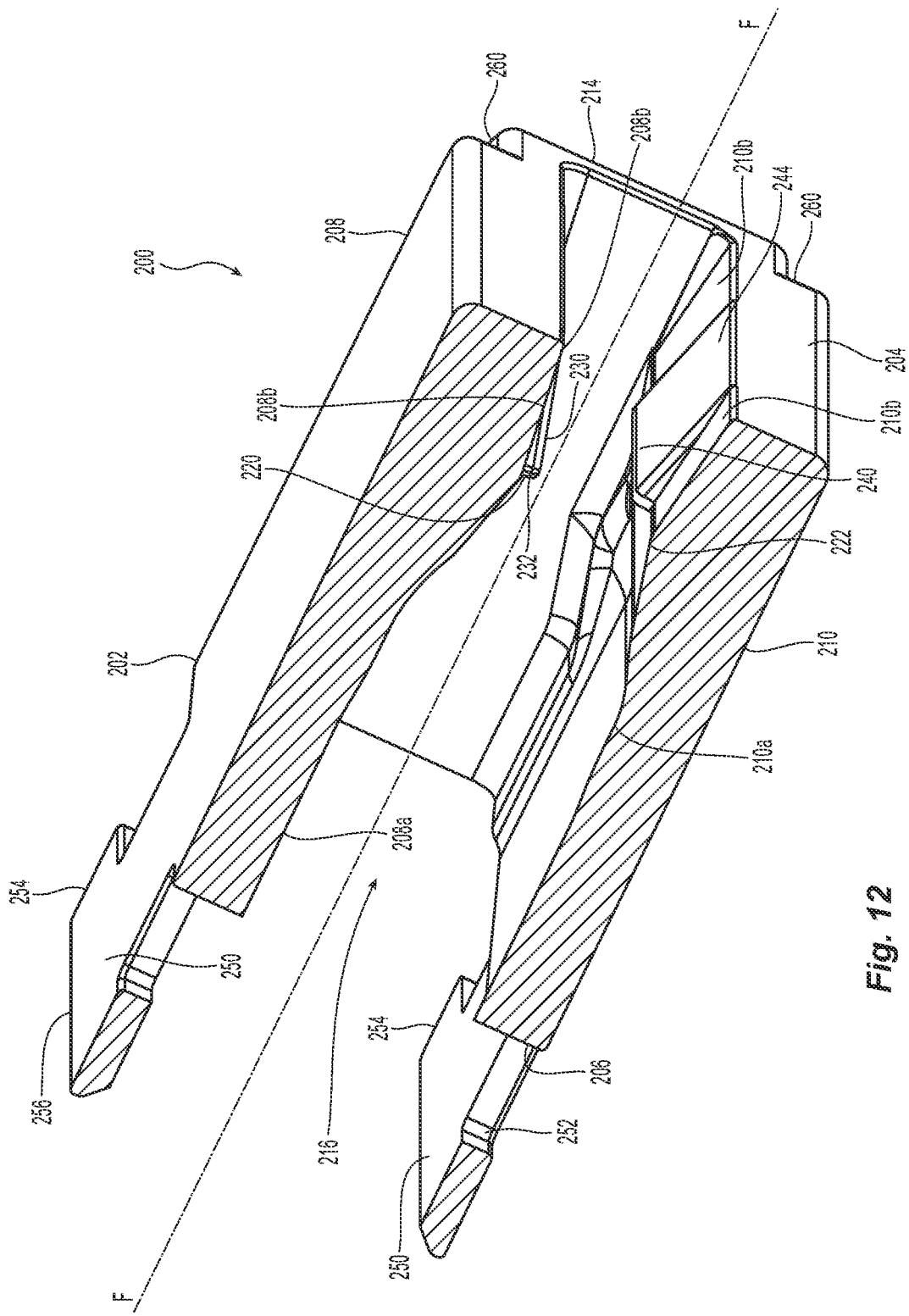
FIG. 12 is a cross-sectional view of the fiber optic ferrule receiver/cap of FIG. 1.
Figure 12A:
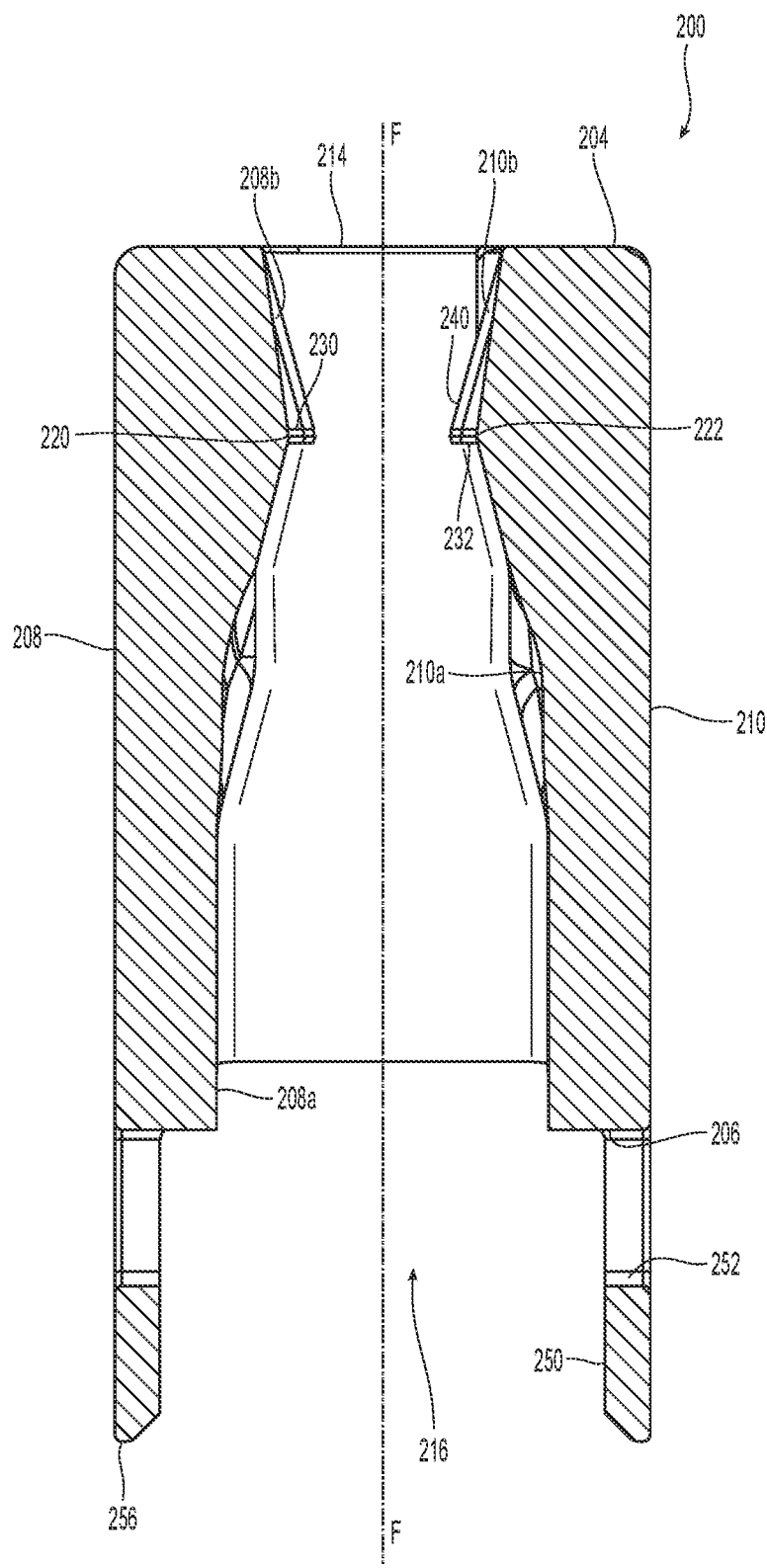
FIG. 12A is an elevational view of a cross section of the fiber optic ferrule receiver/cap of FIG. 1
Figure 14:
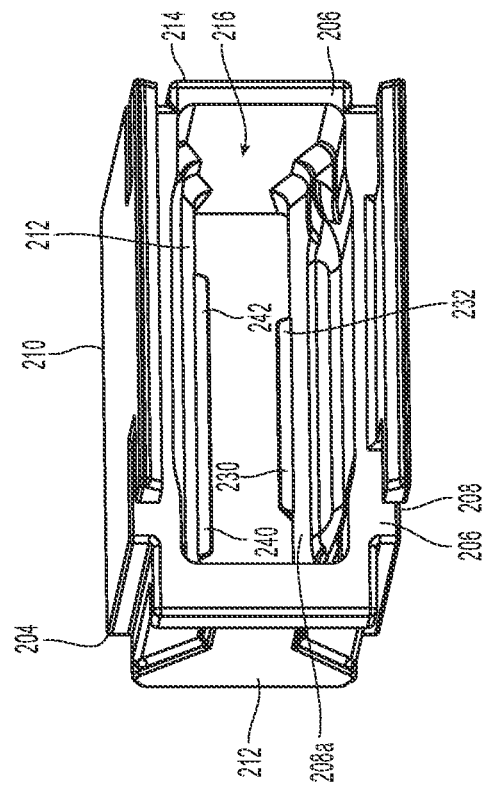
FIG. 14 is a rear perspective view of the fiber optic ferrule receiver/cap of FIG. 11.
Figure 13:
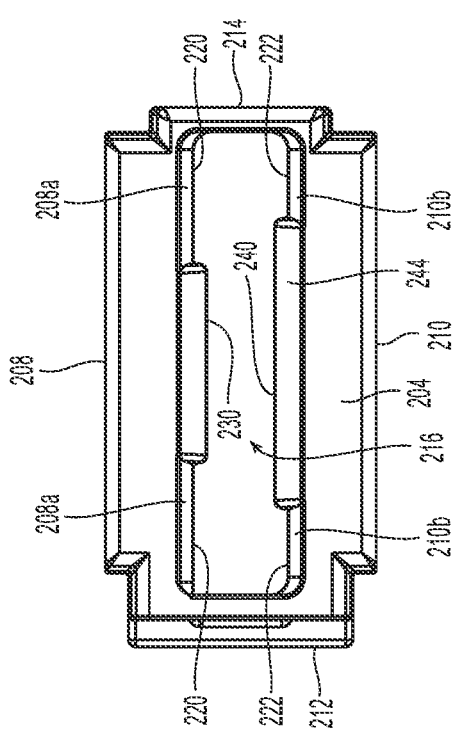
FIG. 13 is a front elevational view of the fiber optic ferrule receiver/cap of FIG. 11.
Figure 15:
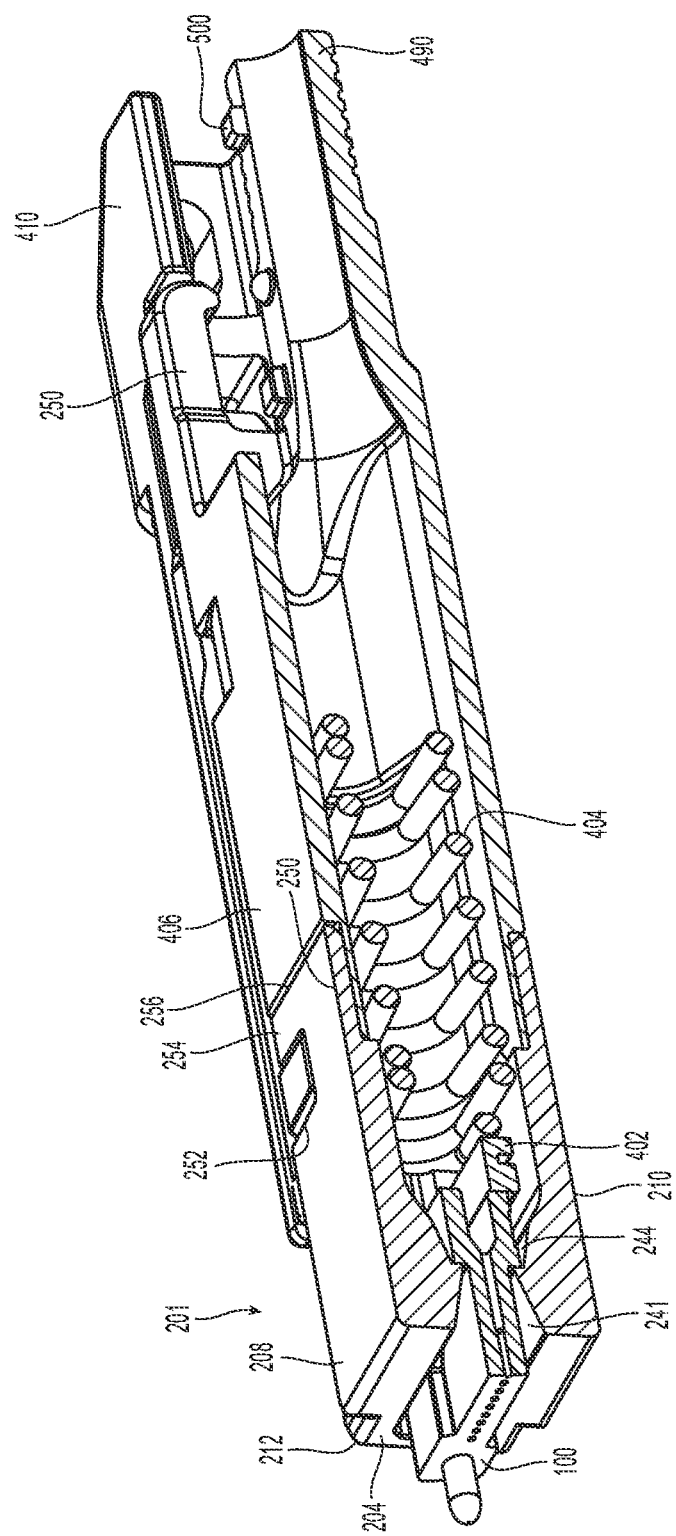
FIG. 15 is a perspective view from the bottom left of a cross-section of the fiber optic connector of FIG. 8.
Figure 16:
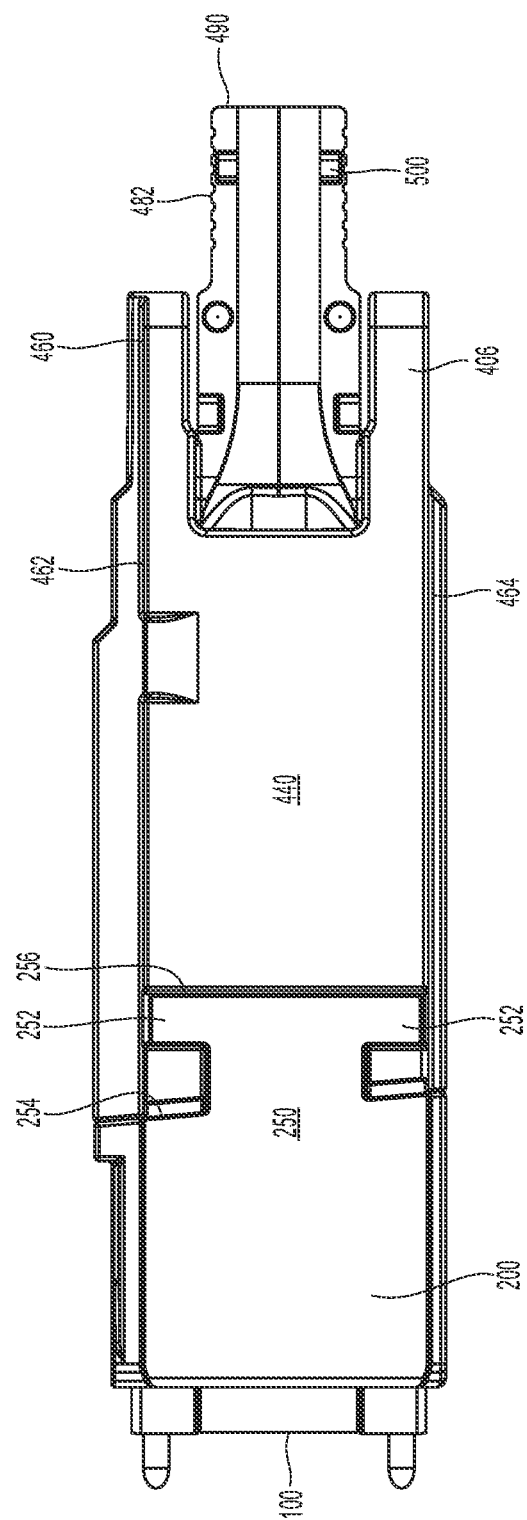
FIG. 16 is a left side elevational view of the fiber optic connector in FIG. 8.
Figure 17:
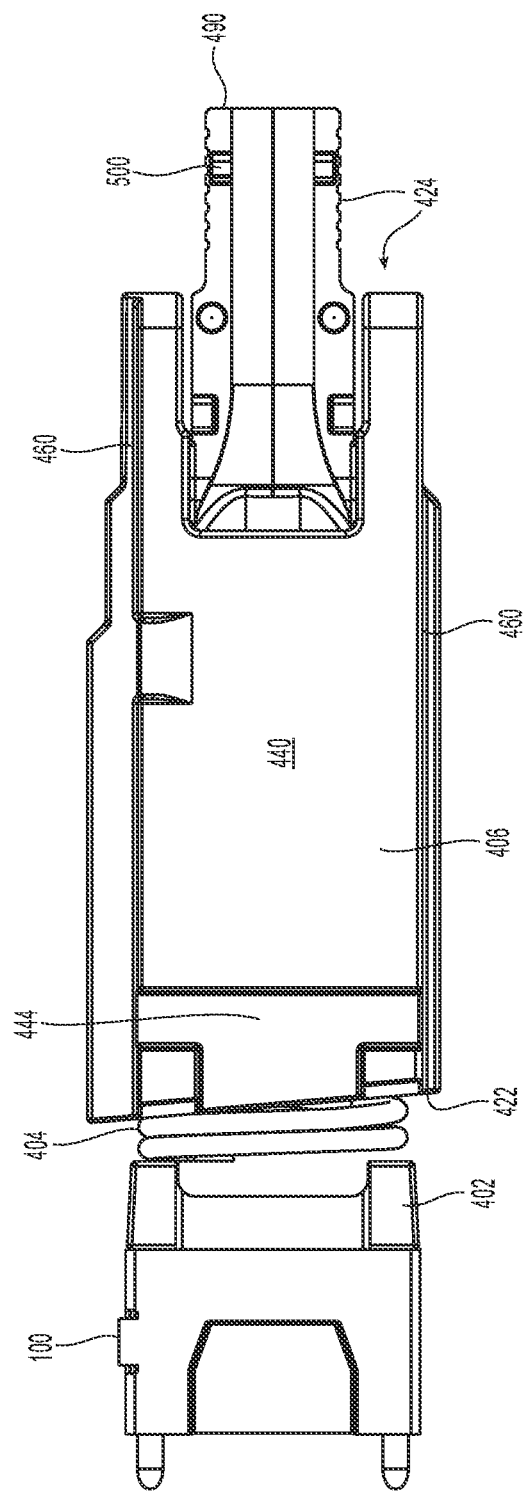
FIG. 17 is a left side elevational view of the fiber optic connector in FIG. 8 with fiber optic ferrule receiver/cap of FIG. 11 removed.
Figure 18:
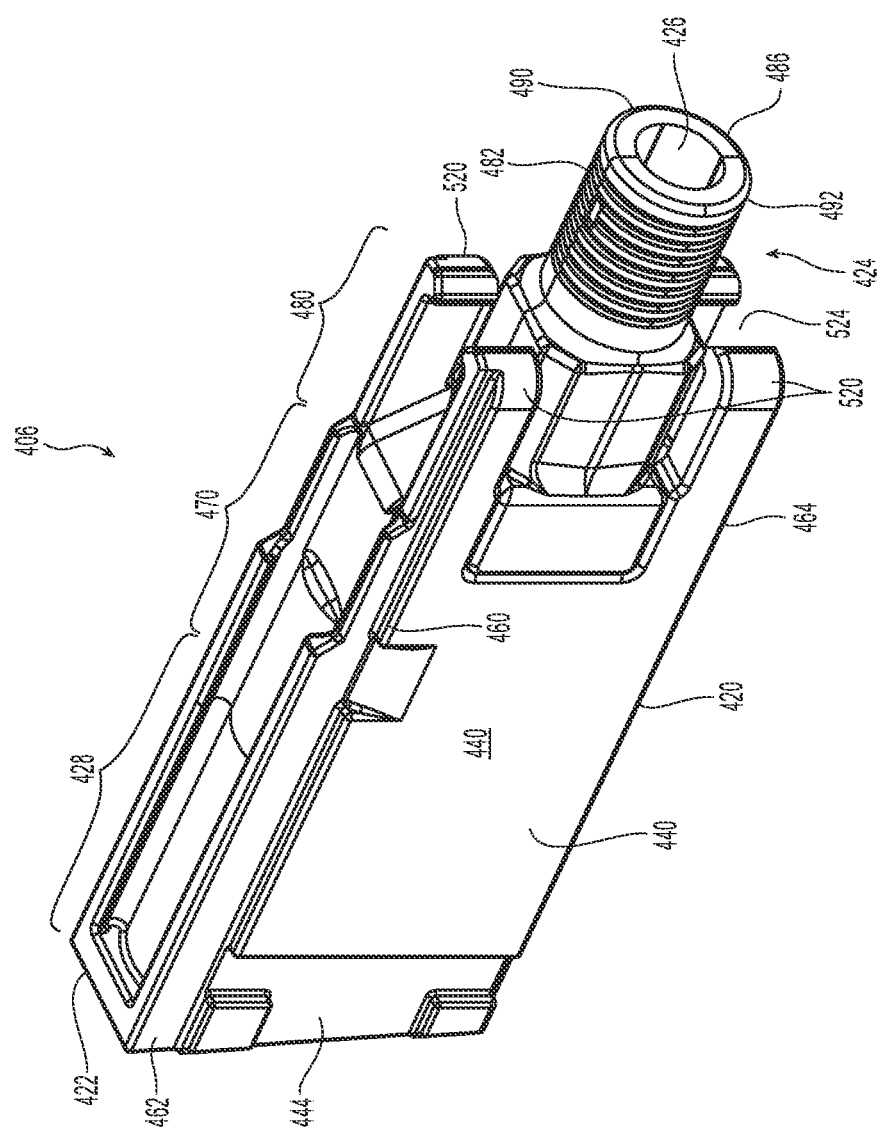
FIG. 18 is a perspective view of the housing of the fiber optic connector in FIG. 8 from the top rear.

The first side 208 has a first tapered surface 208a in the opening 216 as well as a second tapered surface 208b, the first tapered surface 208a reducing the opening 216 between the rear end 206 and a first position 220, and the second tapered surface 208b increasing the opening 216 between the first position 220 and the front end 204. As illustrated in FIG. 12, the first tapered surface 208a may have a number of ramped and flat portions. The first tapered surface 208a is to prevent the front end 114 of the main body 102 of the multi-fiber ferrule 100 from encountering any surface that causes damage to the front end 114 or causes the multi-fiber ferrule 100 from catching as it is inserted into the opening 216.

The second side 210 also has a third tapered surface 210a in the opening 216 as well as a fourth tapered surface 210b, the third tapered surface 210a reducing the opening 216 between the rear end 206 and a second position 222, and the fourth tapered surface 210b increasing the opening 216 between the second position 222 and the front end 204. As can be seen in FIG. 12, the first position 220 and the second position 222 are directly across the opening 216 from each other. However, depending on the configuration of the cut-outs in the multi-fiber ferrule, the first position 220 and the second position 222 may be off set from one another along a longitudinal axis F through the fiber optic ferrule receiver 200. The first portion 220 and the second portion 222 can be thought of as a line that extends across the opening 416 between the third side 212 and the fourth side 214 and on the first side 208 and the second side 210, respectively. Alternatively, the first position 220 and/or the second position 222 may be a flat surface, e.g., parallel to the first side 208 and the second side 210. That is, there may be a flat surface formed at a junction of the first tapered surface 208a and the second tapered surface 208b. Likewise, there may be another flat surface formed at a junction of the third tapered surface 210a and the fourth tapered surface 210b.

The fiber optic ferrule receiver 200 has a first projection 230 extending into the opening 216 from the first side 208 to engage the multi-fiber ferrule 100 at the first position 220. Preferably the first projection 230 engages the first forward facing surface 132 of the multi-fiber ferrule 100. However, as noted above, the first projection 230 could engage any appropriate structure on the multi-fiber ferrule 100. The projection 230 preferably has a rearward facing surface 232 to engage the first forward facing surface 132 of the multi-fiber ferrule 100. Additionally, the first projection 230 extends across the opening 216 in the appropriate location and width for that engagement. The first projection 230 preferably has a ramp surface 234 that extends from the first position 220 towards the front end 204. While the ramp surface 234 extends all of the way to the front end 204, it could stop short thereof. Alternatively, the first projection 230 may have other configurations, such as a flat plateau like profile, instead of a ramp to engage the multi-fiber ferrule 100.

Similarly, the ferrule receiver 200 has a second projection 240 extending into the opening 216 from the second side 210 to engage the multi-fiber ferrule 100 at the second position 222. Preferably the second projection 240 engages the second forward facing surface 152 of the multi-fiber ferrule 100. However, as noted above, the second projection 240 could engage any appropriate structure on the multi-fiber ferrule 100. The second projection 240 preferably has a rearward facing surface 242 to engage the second forward facing surface 152 of the multi-fiber ferrule 100. Additionally, the second projection 240 extends across the opening 216 in the appropriate location and width for that engagement with the fiber optic ferrule receiver 200. As is clear in FIG. 13 (showing the view from the front of the ferrule receiver 200), the first projection 230 is not as wide as the second projection 240 so that the multi-fiber ferrule 100 can only be inserted into the fiber optic ferrule receiver 200 in one way. The second projection 240 also preferably has a ramp surface 244 that extends from the second position 222 towards the front end 204. While the ramp surface 244 extends all of the way to the front end 204, it could stop short thereof. Alternatively, similar to the first projection 230, the second projection 240 may have other configurations, such as a flat plateau like profile, instead of a ramp to engage the multi-fiber ferrule 100.

The configuration of the first projection 230 and the second projection 240, particularly with the ramp surfaces 234,244 cause the second and fourth tapered surfaces 208b, 210b to be split into two sections—one on each side of the projections 230, 240. See FIG. 13. At those locations, the first tapered surface 208a and the second tapered surface 208b, as well as the third tapered surface 210a and the fourth tapered surface 210b, are connected to one another about the first position 220 and second position 222, respectively. Such a connection, as noted above, may be along a line or along a flat plane.

The rear end 206 of the main body 202 is not orthogonal to the longitudinal axis F extending through the main body 202. See, e.g., FIG. 11. Rather, it has an angle that matches the angle at the front of the housing 406. One will be able to discern from this angled surface, where the first projection 230 and the second projection 240 are within the main body 202. This will allow for the multi-fiber ferrule 100 to be inserted so that the first projection 230 and the second projection 240 engage correct ones of the forward facing surfaces 132, 152 in the multi-fiber ferrule 100. See, e.g., FIGS. 12 and 15.

Extending from the rear end 206, and away from the main body 202, are two tabs 250, one is mounted on side 208 and the other on side 210. The two tabs 250 each have a shape of the letter "T". The tabs 250 have cut-outs 252 which form legs 254. The tabs 250 and the legs 254 are able to flex outward from the opening 216 and engage the housing 406 as described below. See also FIGS. 15 and 16. The tabs 250 have a rear surface 256 that is perpendicular to the longitudinal axis F. The cut-outs 252 between the tab 205 and the legs 254 are not rectangular, but are trapezoidal, allowing the rear end 206 to be angled, while still having the rear surface 256 and the front end 204 perpendicular to the longitudinal axis F.

The main body 202 of the fiber optic ferrule receiver 200 has a plurality of shoulders 260 that extending from the front end 204 to the rear end 206. The shoulders are generally at the corners of the main body 202, where the sides 208,210, 212,214 meet. These shoulders 260 act as a guide to align the fiber optic connector 400 with another receptacle, such as an adapter.

Figure 20:
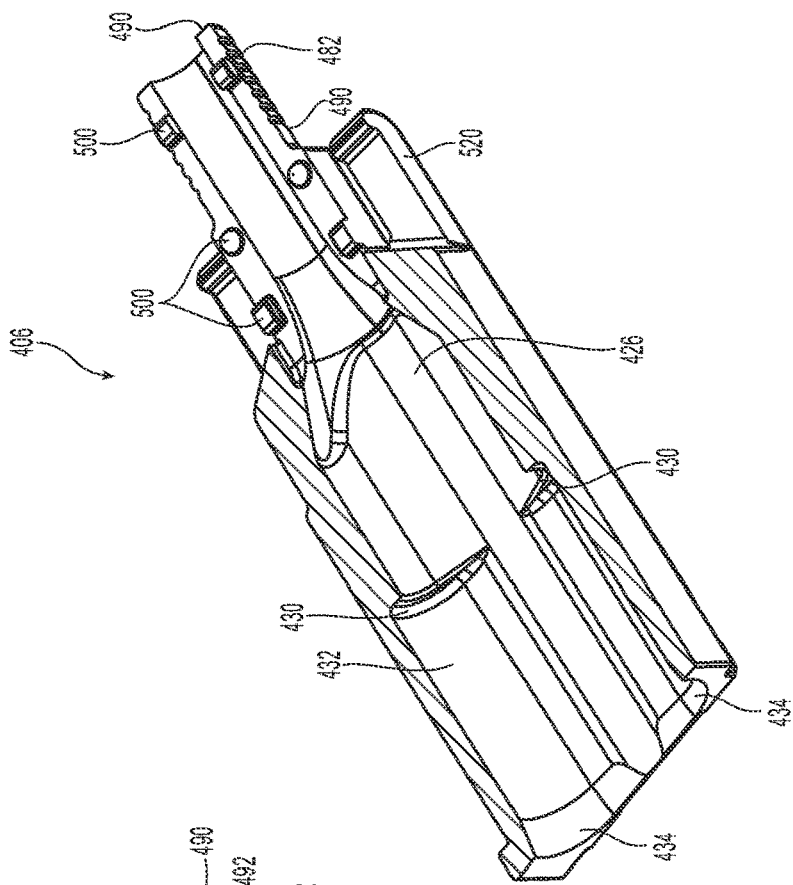
FIG. 20 is a perspective view of a cross section of the housing in FIG. 18 with the second portion of the rear section removed.

The housing 406 will now be described with reference to FIGS. 18-28. The housing 406 has a main body 420 that extends between a front end 422 and a rear end 424 and generally has three sections. The housing 406 also has an opening 426 that extends between the front end 422 and the rear end 424. The first section 428 is a front section that receives an elastic member such as spring 404. As noted above, the elastic member or spring 404 is to engage, directly or indirectly, the rear end of the multi-fiber ferrule 100 and bias it in a forward direction. The spring 404 engages forward facing surfaces 430 that extend into the opening 426 from the interior surface 432 and function as an integral spring stop. Referring to FIG. 20, in the cross-section, two of the forward facing surfaces 430 are illustrated, each continuing around one side of the housing 406 internally (see also FIG. 21) on the other half of the main body 420 that is not visible.

Alternatively, there could preferably be four of the forward facing surfaces 430, two for the half shown in FIG. 20, and two more for the half of the housing 406 that has been cut in the cross-section of FIG. 20. See also FIGS. 25 and 26. The front end 422 has a chamfered surface 434 that assists in inserting the spring 404 during the initial insertion as well as movement of the spring 404 during use of the housing 406 in the fiber optic connector 400. The opening 426 is illustrated as being oval in cross section, but it could have other configurations as needed (e.g., an elliptical configuration). The spring 404 is accordingly shaped to be received inside the opening 426, and engage and seat at the forward facing surfaces 430.

Figure 19:
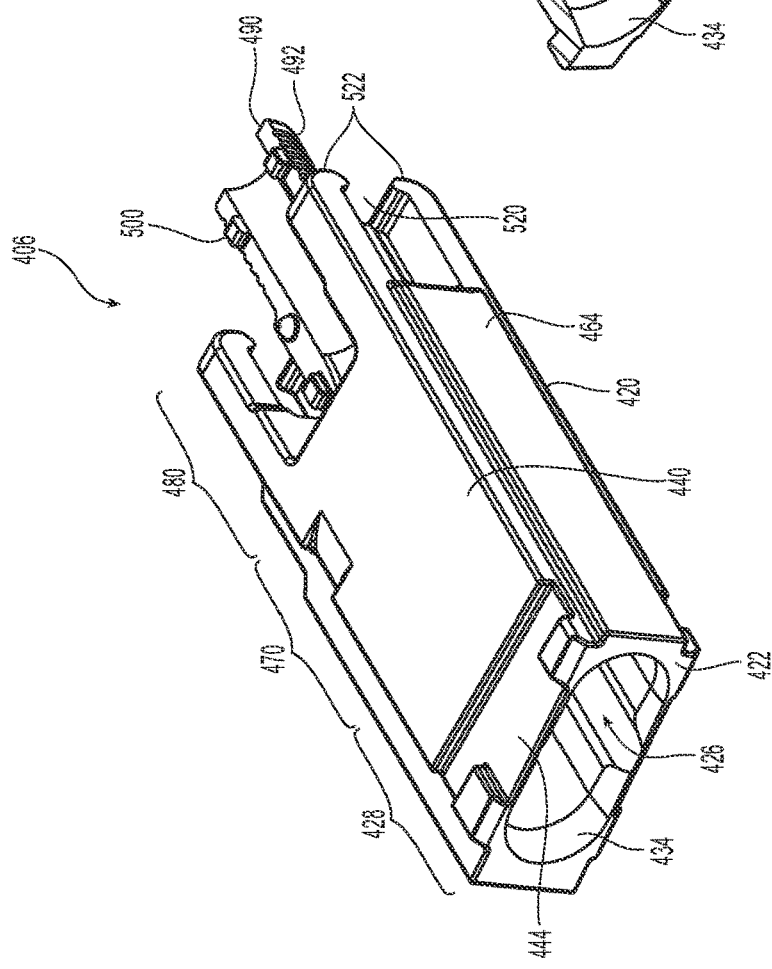
FIG. 19 is a perspective view of the housing of the fiber optic connector in FIG. 8 from the bottom left side.
Figure 22:
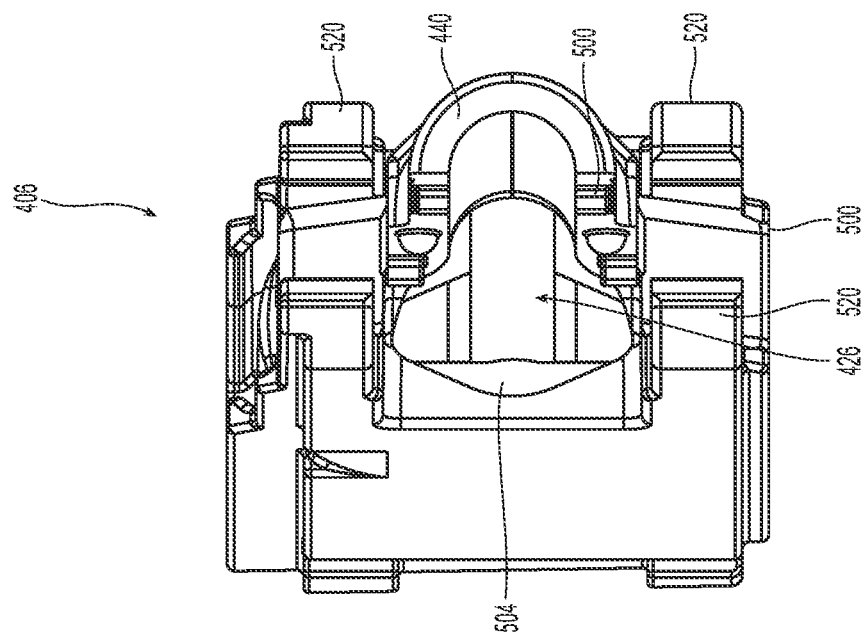
FIG. 22 is a perspective view of the housing of the fiber optic connector in FIG. 8 from the rear.
Figure 21:
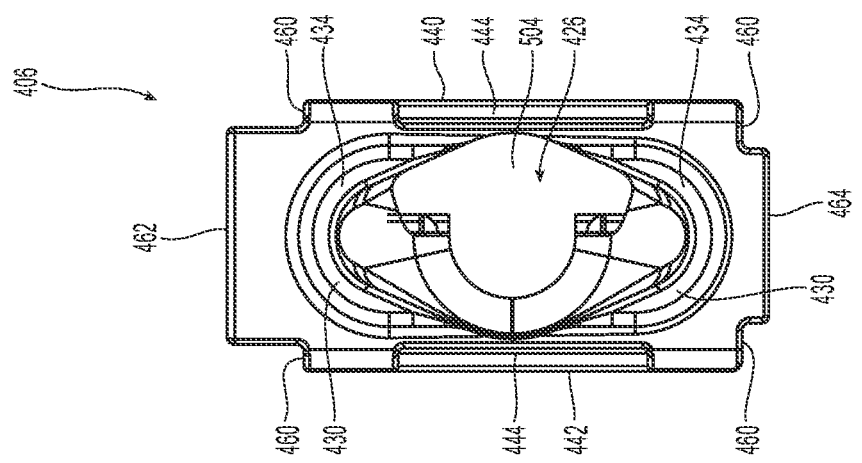
FIG. 21 is a front elevational view of the housing of the fiber optic connector in FIG. 8.
Figure 23:
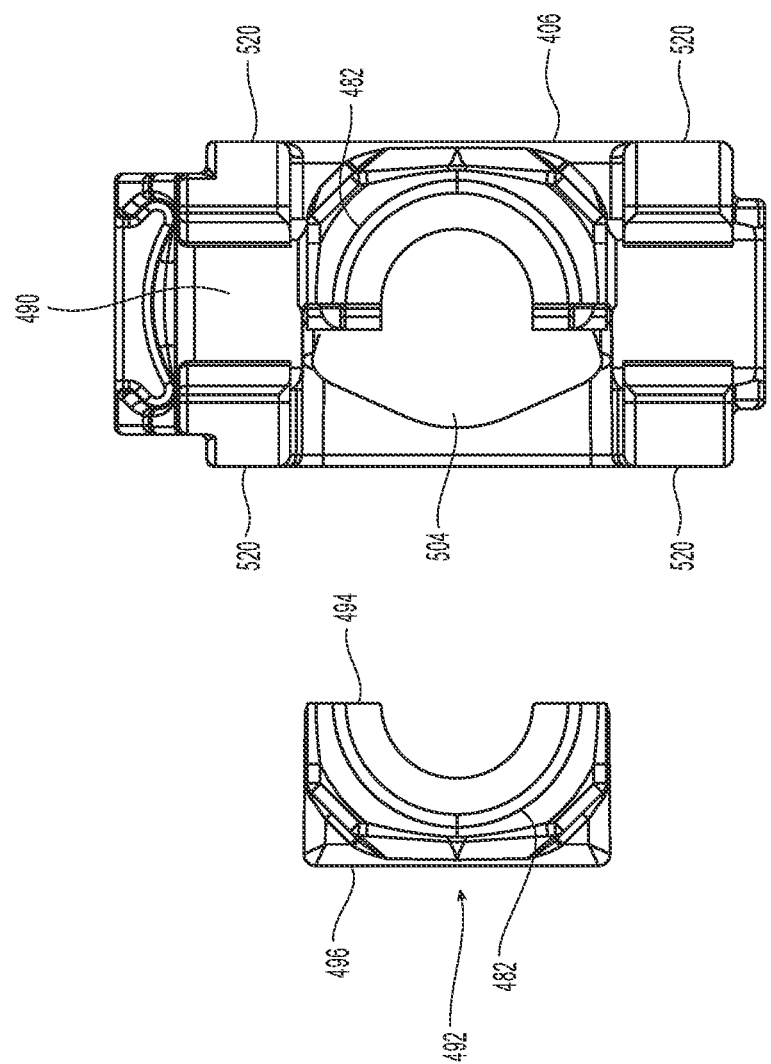
FIG. 23 is a rear elevational view of the housing of the fiber optic connector in FIG. 8.
Figure 27:
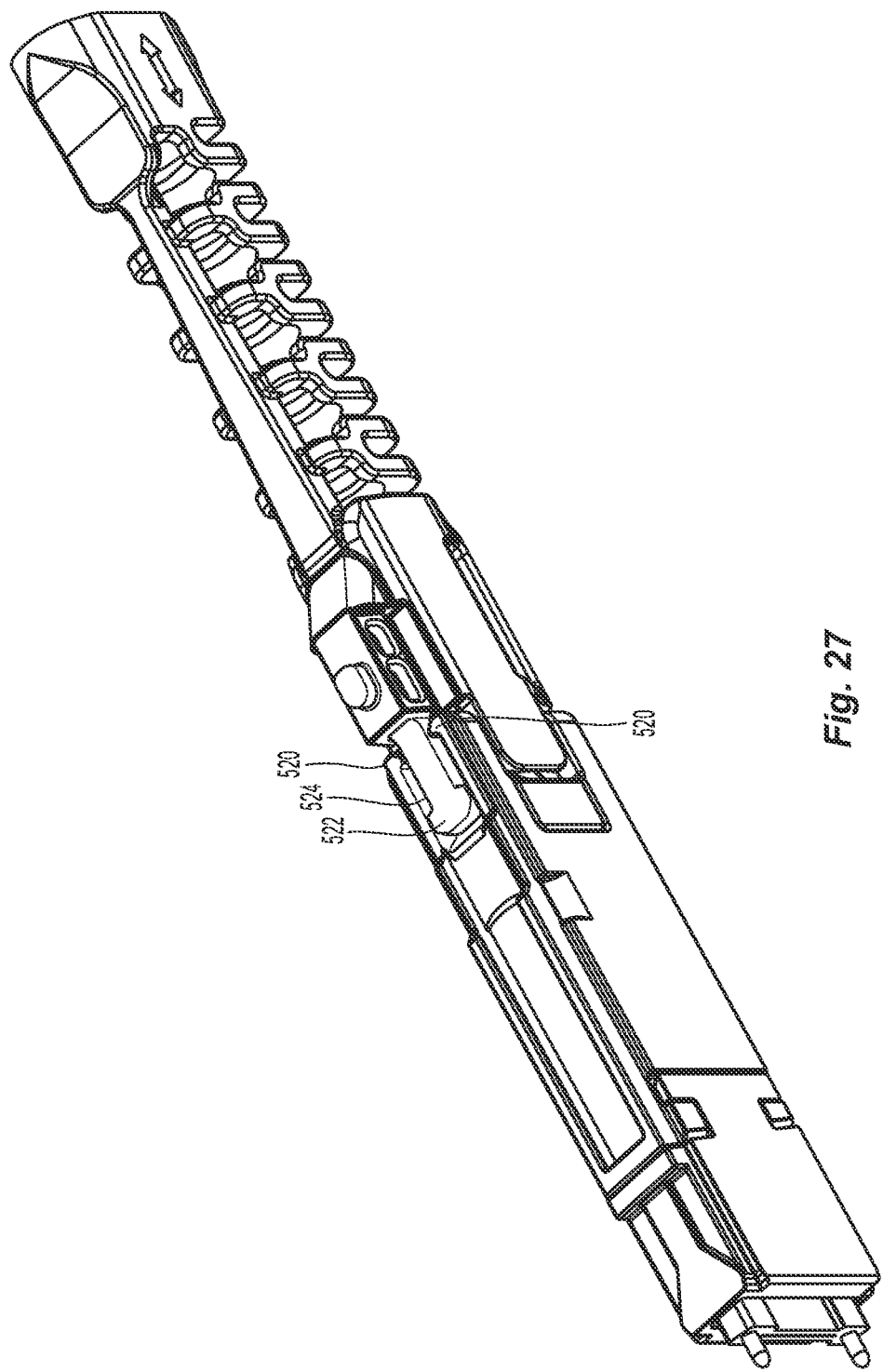
FIG. 27 is a perspective view of the fiber optic connector in FIG. 25 from the top left.
Figure 28:
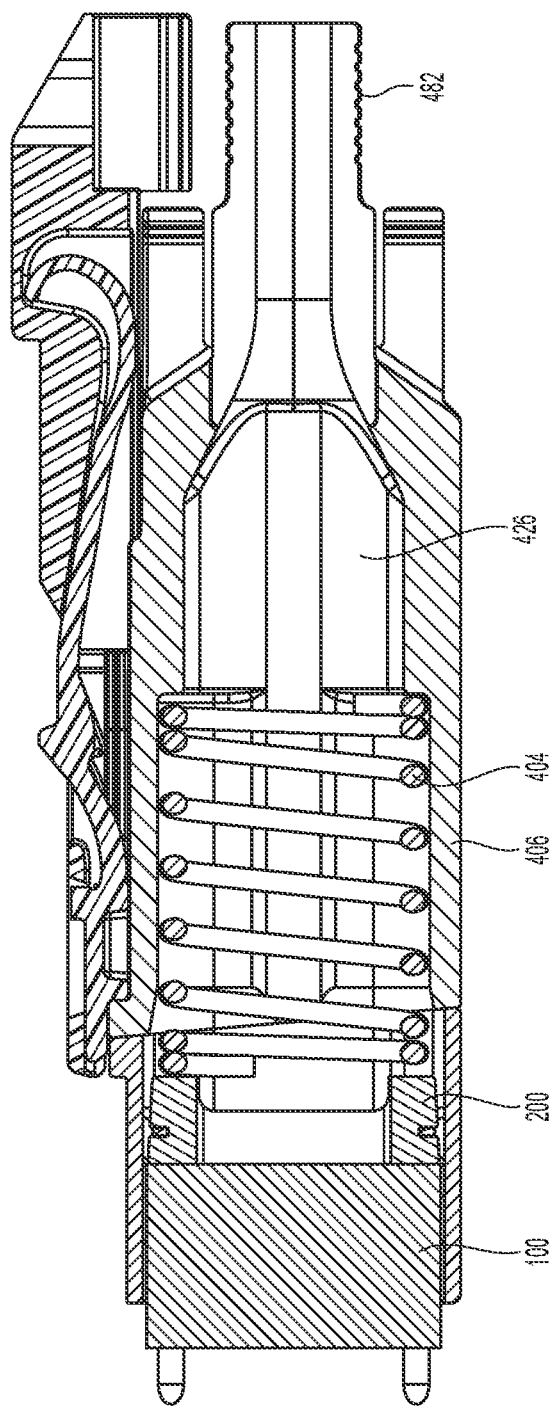
FIG. 28 is an elevational view of a cross section of a portion of the fiber optic connector in FIG. 25.
Figure 29:
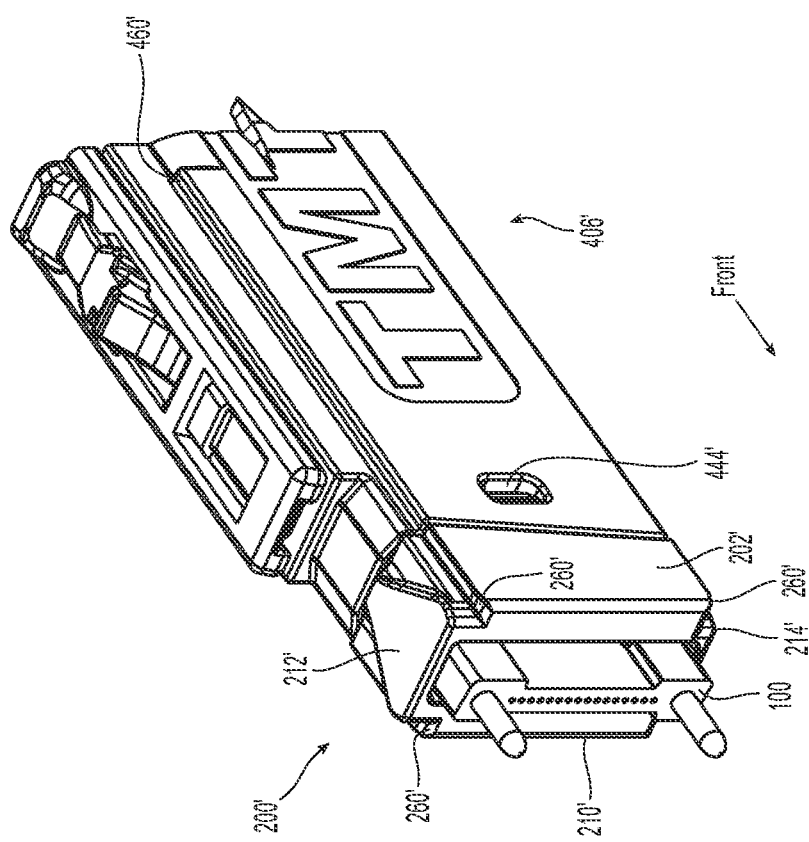
FIG. 29 is a perspective view of another embodiment of a fiber optic connector according to the present invention.
Figure 32:
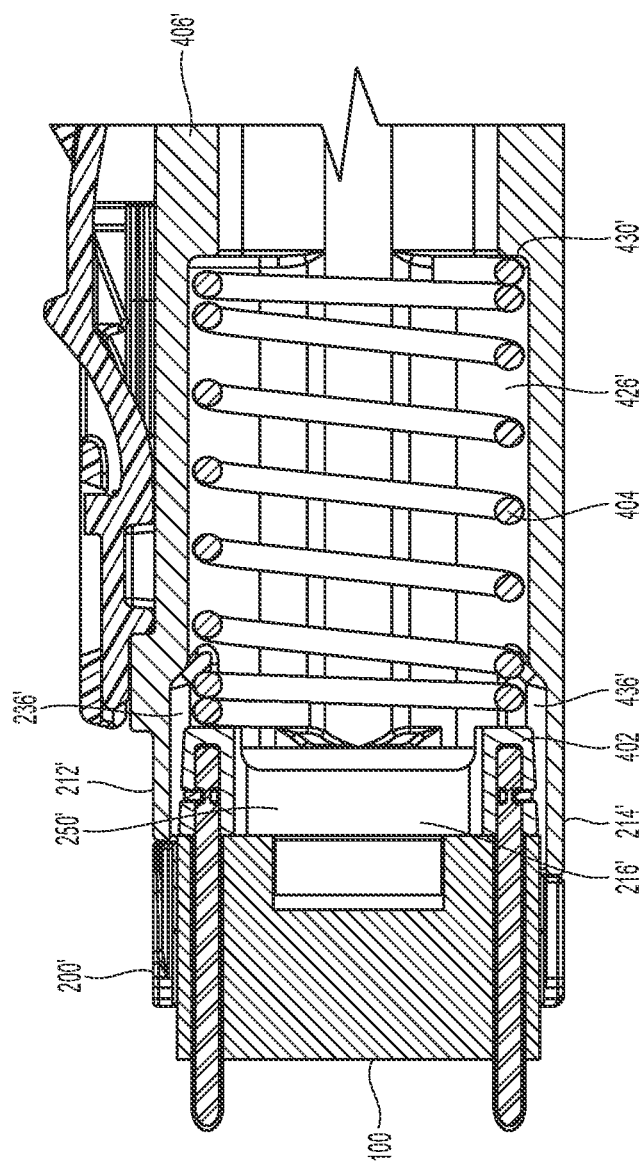
FIG. 32 is an elevational view of a cross section view of the fiber optic connector in FIG. 29.

Also at the front end 422 and on first side 440 and on opposing second side 442 are depressions 444 to receive the tab 250 and legs 254 from the fiber optic ferrule receiver 200 to removably secure the fiber optic ferrule receiver 200 to the main body 420. See, FIG. 19 and FIG. 21 showing a front view of the housing 406.

The main body 420 of the housing 406 has a plurality of shoulders 460 that extending from the front end 422 to the rear end 424. The shoulders are generally at the corners of the main body 420, where first side 440 meets with top side 462 and bottom side 464 and second side 442 meets with top side 462 and bottom side 464. These shoulders 460 act as a guide to align the fiber optic connector 400 with another receptacle, such as an adapter. The shoulders 460 also match with the shoulders 260 on the fiber optic ferrule receiver 200 to form a continuous shoulder at each corner.

The second or middle section 470 provides an area for the optical fibers 300 to transition from a flat ribbon to a grouping that can be protected by a round fiber optic cable covering. Referring to FIG. 26, the optical fibers 300 extend from the multi-fiber ferrule 100 in a flat configuration, the middle section 470 allows for them to be grouped together to pass out the rear end 424 in circular configuration and in a cable sheath 302. As is known in the art, the optical fibers 300 cannot be bent beyond their bend radius without damaging the optical fibers 300. This transition area 470 assists in preventing such damage. The transition area 470 is dimensioned to maintain a safe bend radius for the individual optical fibers 300 as these optical fibers 300 transition from a ribbon form to a fiber optic cable form with loose fibers therein.

The third or rear section 480 is used to finalize the configuration of the optical fibers 300 from the transition area in the middle section 470 to the cable format. The rear section 480 has an outer surface 482 to engage the crimp ring 408. The outer surface 482 is on a circular extension or crimp body 486 that extends from the rear end 424. Additionally, the crimp body 486 is preferably made from two portions, a first portion 490 that is integral with the main body 420 and a second portion 492 that is removable from the main body 420 and the first portion 490. See FIGS. 19-20 and 23-24. The second portion 492 has a rear section 494 that is a half cylinder and a forward section 496 that mates with the main body 420 to close the middle section 470. The rear portion 494 mates with the first portion 490 to form the cylindrical shape that can accept the crimp ring 408. The rear section 494 mates with the first portion 490 with a series of projections 500 and recesses 502. As illustrated in the figures, the projections 500 are on the first portion 490 and the recesses 502 are on the second portion 492. However, the projections and recesses could be reversed or mixed with regard to their positions on the first portion 490 and the second portion 492. The projections 500 preferably frictionally engage the recesses 502 and then once the crimp ring 408 is secured around the crimp body 486, the two portions 490,492 will not move relative to one another.

The forward section 496 of the second portion 492 mates with the main body 420 of the housing 406. The main body 420 has an extra portion 504 that has been cut out to allow for more optical fibers and larger groups of optical fibers to pass through the opening 426. This makes the opening 426 at the forward section 496 larger than on the opposing side. The larger opening 426 allows the housing 406 to be installed onto the cable and slid down the cable and out of the way during termination and polishing of the ferrule 100. That is when viewed straight into the opening 426 from the rear section 494, or even from the front end 422, the opening 426 is asymmetrical due to the presence of the first portion 490 and the extra portion 504. See FIGS. 22, 23. The forward section 496 of the crimp body 486 has a tab 506 that extends into the extra portion 504 to close it off when the two portions 490,492 are mated.

The housing 406 also has a number of latches 520 that extend from the main body 420 to engage a push-pull boot 410 and more specifically two latches 522 on the push-pull boot. See FIGS. 9, 10, 24, and 27. As illustrated, the latches 522 on the push-pull boot can slide in the area 524 between two latches 520 on each side of the housing 406. See FIG. 27. When the push-pull boot 410 is pulled, the latches 522 slide within the area 524 until they reach the end of the latches 520 and at this point, the force is transferred to the latches 520 and the housing 406 to remove the fiber optic connector from its receiver. To insert the fiber optic connector 400, the push-pull boot 410 is pushed until the latches 522 engage the front end of the area 524, which then transfers to the housing 406 and moves the fiber optic connector in a forward direction to secure it within a receptacle.

Figure 39:
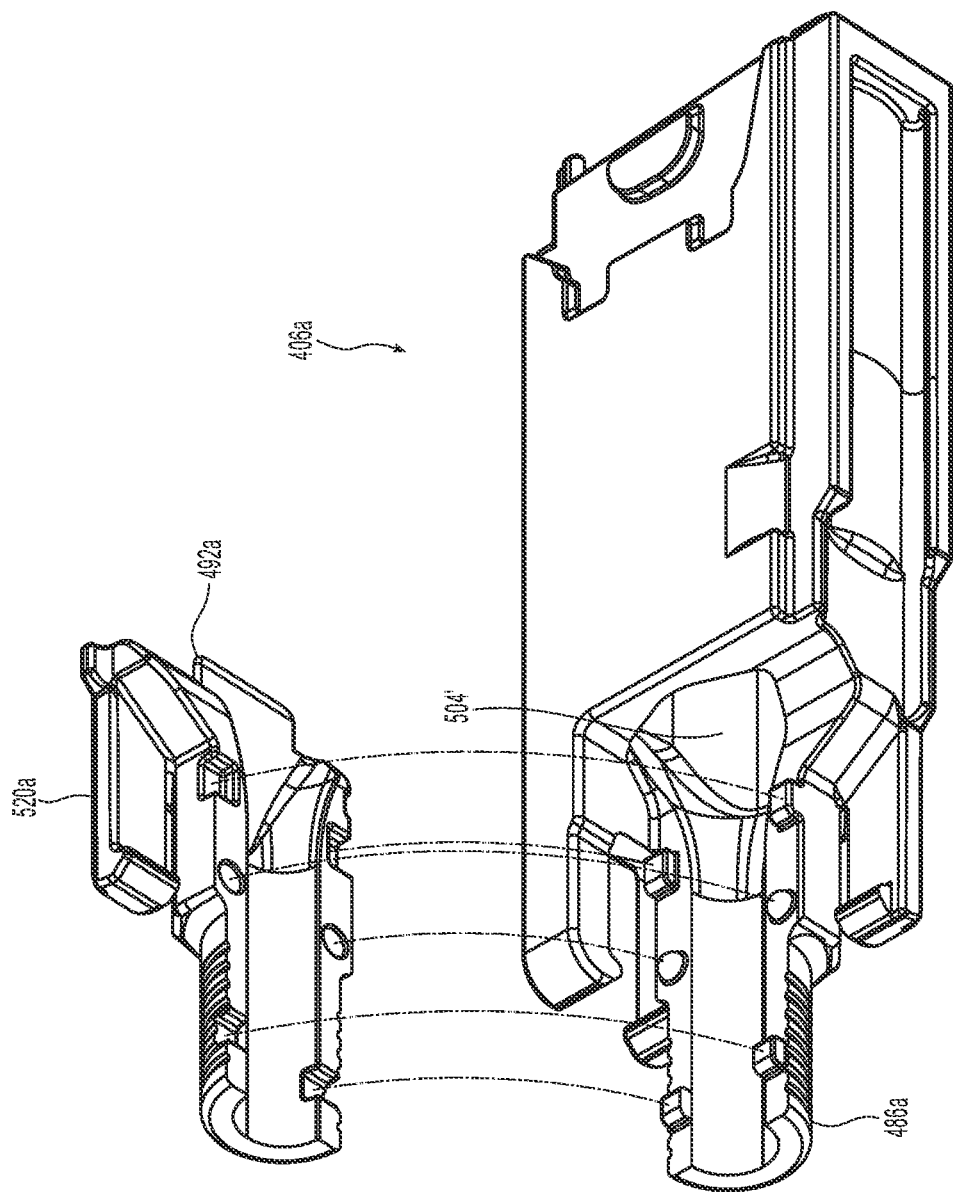
FIG. 39 is an exploded perspective view of another embodiment of a housing according to the present invention.

It is also possible, as an alternative to this configuration, whereby at least one of the latches is molded on the second portion. Referring to FIG. 39, there is a housing 406a that has a second portion 492a of a crimp body 486a and a latch 520a molded thereon. The housing 406a has the same components as the housing discussed above, as well as the extra portion 504' that has been cut out to allow for more optical fibers and larger groups of optical fibers to be used with this housing 406a.

Another embodiment of a housing 406' and a fiber optic ferrule receiver 200' according to the present invention are illustrated in FIGS. 29-34. First, it should be noted that the fiber optic ferrule that is used in these figures corresponds to multi-fiber ferrule 100 discussed above, but another fiber optic ferrule could also be used.

This embodiment of a fiber optic ferrule receiver 200' includes a main body 202' extending between a front end 204' and a rear end 206'. As in the prior embodiment, the main body 202' also has four sides 208',210',212',214', and an opening 216' extending between the front end 204' and the rear end 206' and being defined at least by a portion of internal surfaces of the four sides 208',210',212',214'. The fiber optic ferrule receiver 200' also includes two tabs 250' that extend rearwardly from the rear end 206'. The two tabs 250' each have a projection 252' that extend outwardly and away from each other. The projections 252' are designed to engage an opening 444' on each side of the housing 406', as described in more detail below. The two tabs 250' are somewhat flexible in that they can flex inward to be inserted into the housing 406' and subsequently return, at least partially, to their pre-flexed configuration. This allows the fiber optic ferrule receiver 200' to be retained in the housing 406'.

Figure 33A:
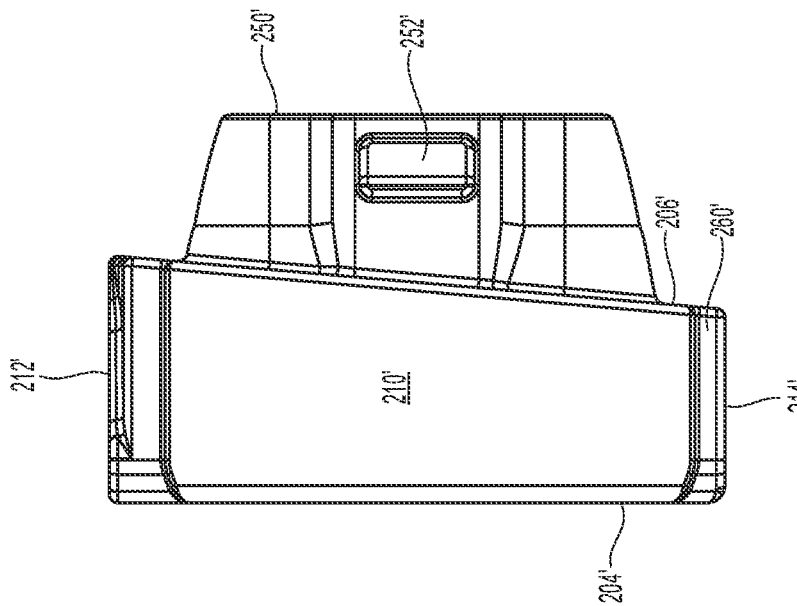
FIG. 33A is a left side elevational view of the fiber optic ferrule receiver/cap in FIG. 29.
Figure 33:
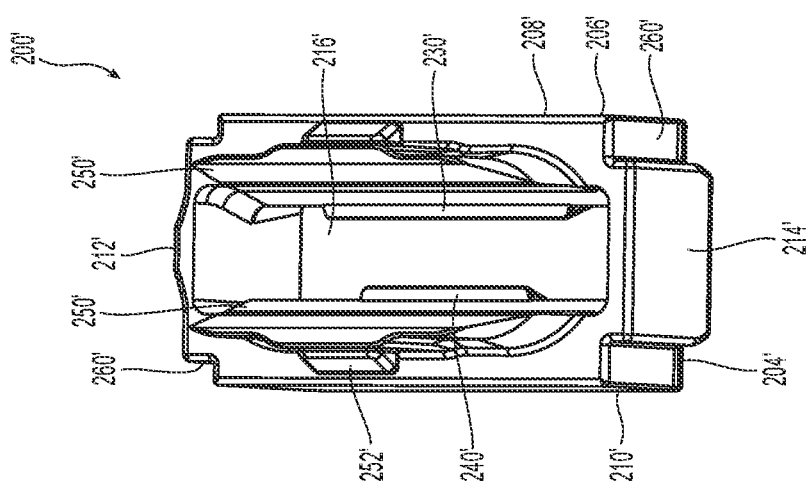
FIG. 33 is a perspective view of the fiber optic ferrule receiver/cap used with the fiber optic connector in FIG. 29.

Turning to FIG. 33A, the length of fiber optic ferrule receiver 200' (the distance between the front end 204' and the rear end 206') is shorter than that of fiber optic ferrule receiver 200. The housing 406' is therefore longer so that the combination of the housing 406' and the fiber optic ferrule receiver 200' are preferably the same overall length. It is also clear from FIG. 33A that the rear end 206' of the a fiber optic ferrule receiver 200' and the front end of the housing 406' are slanted as in the previous embodiment for the purposes of polarity.

The opening 216' of the fiber optic ferrule receiver 200' has the same general configuration of a fiber optic ferrule receiver 200. That is, first side 208' and second side 210' are on opposite sides of the opening 216', while third side 212' and fourth side 214' are each connected to the first side 208' and the second side 210' and are opposite each other about the opening 216'. Third side 212' and fourth side 214' have internal surfaces that are preferably flat and linear, but they may have tapering features discussed above.

First side 208' has a first tapered surface 208a' in the opening 216' as well as a second tapered surface 208b', the first tapered surface 208a' reducing the opening 216' between the rear end 206' and a first position 220', and the second tapered surface 208b' increasing the opening 216' between the first position 220' and the front end 204'. See FIG. 34. The first tapered surface 208a' may have a number of ramped and flat portions. The first tapered surface 208a' is to prevent the front end 114 of the main body 102 of the multi-fiber ferrule 100 from encountering any surface that causes damage to the front end 114 or causes the multi-fiber ferrule 100 from catching as it is inserted into the opening 216'.

Figure 34:
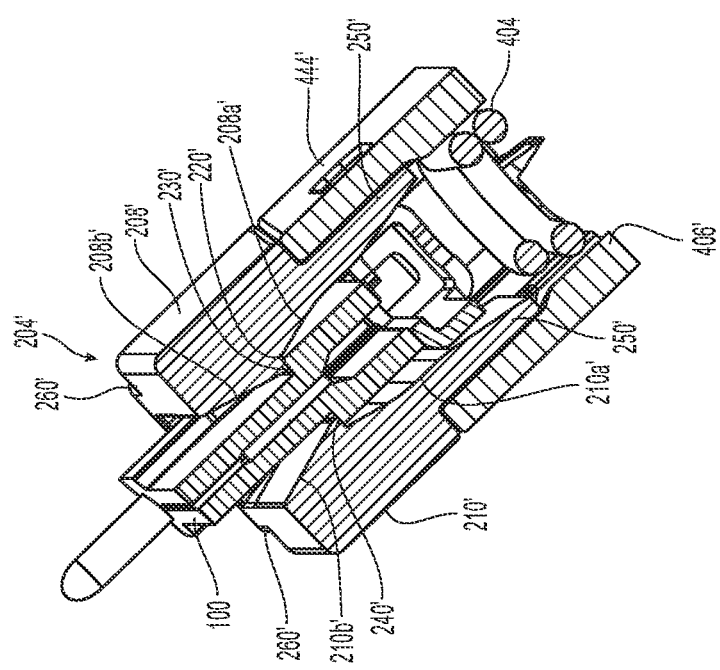
FIG. 34 is a cross section of the fiber optic ferrule receiver/cap of FIG. 33 with a multi-fiber ferrule installed therein.
Figure 35:
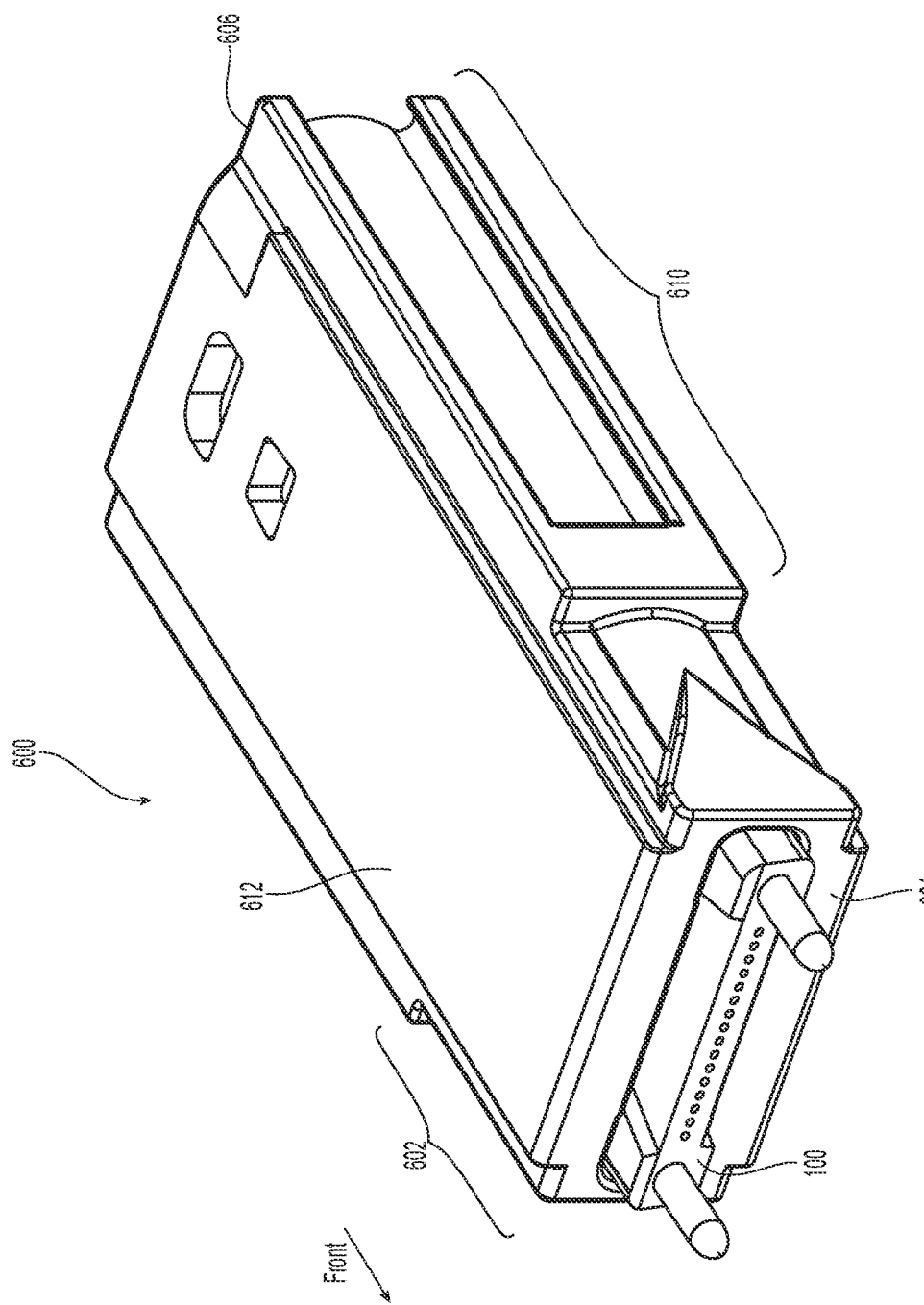
FIG. 35 is a perspective view of another embodiment of a combination of a fiber optic ferrule receiver/cap and housing according to the present invention.
Figure 36:
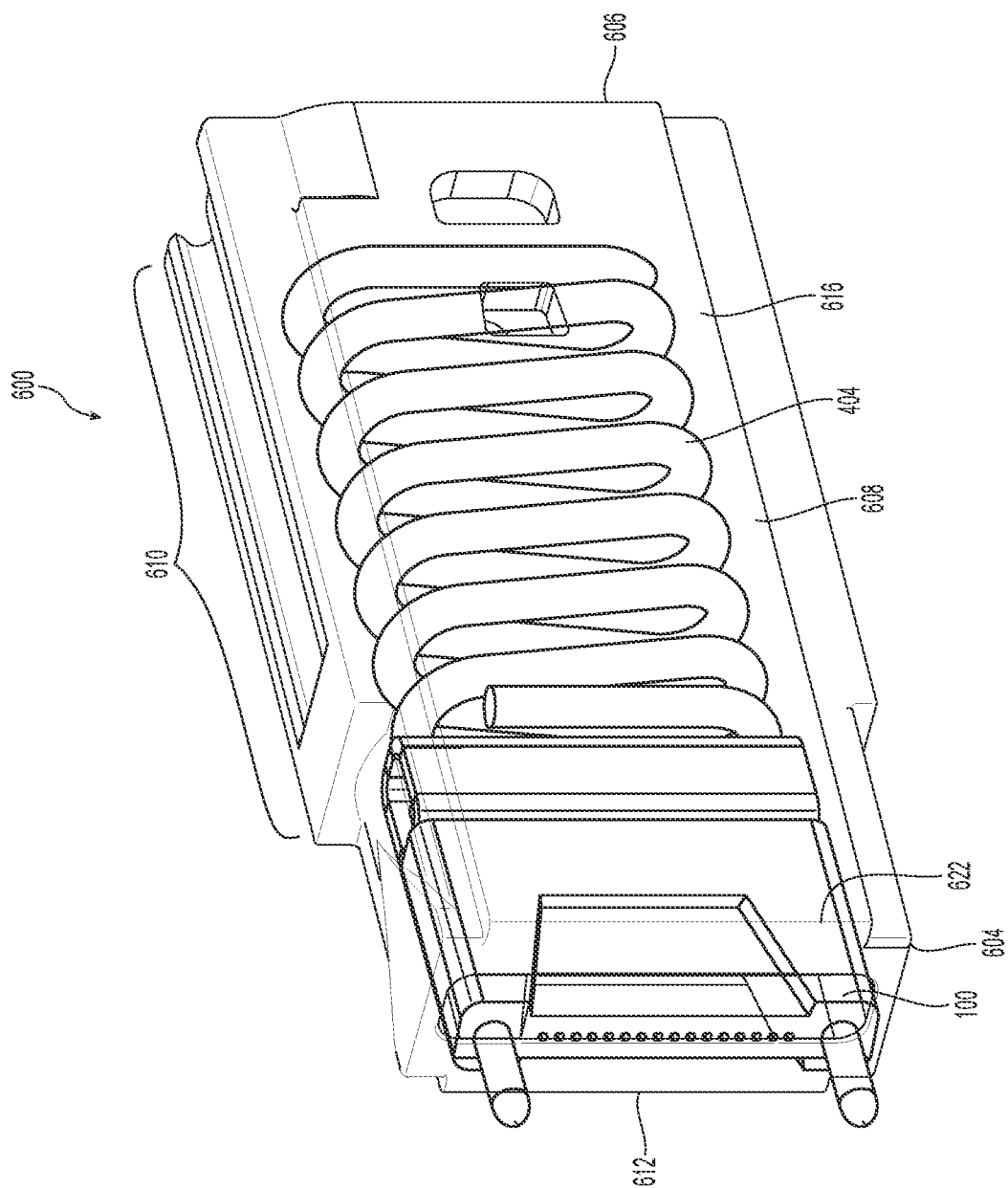
FIG. 36 illustrates the multi-fiber ferrule and the spring disposed within the opening of the housing in FIG. 35.
Figure 37:
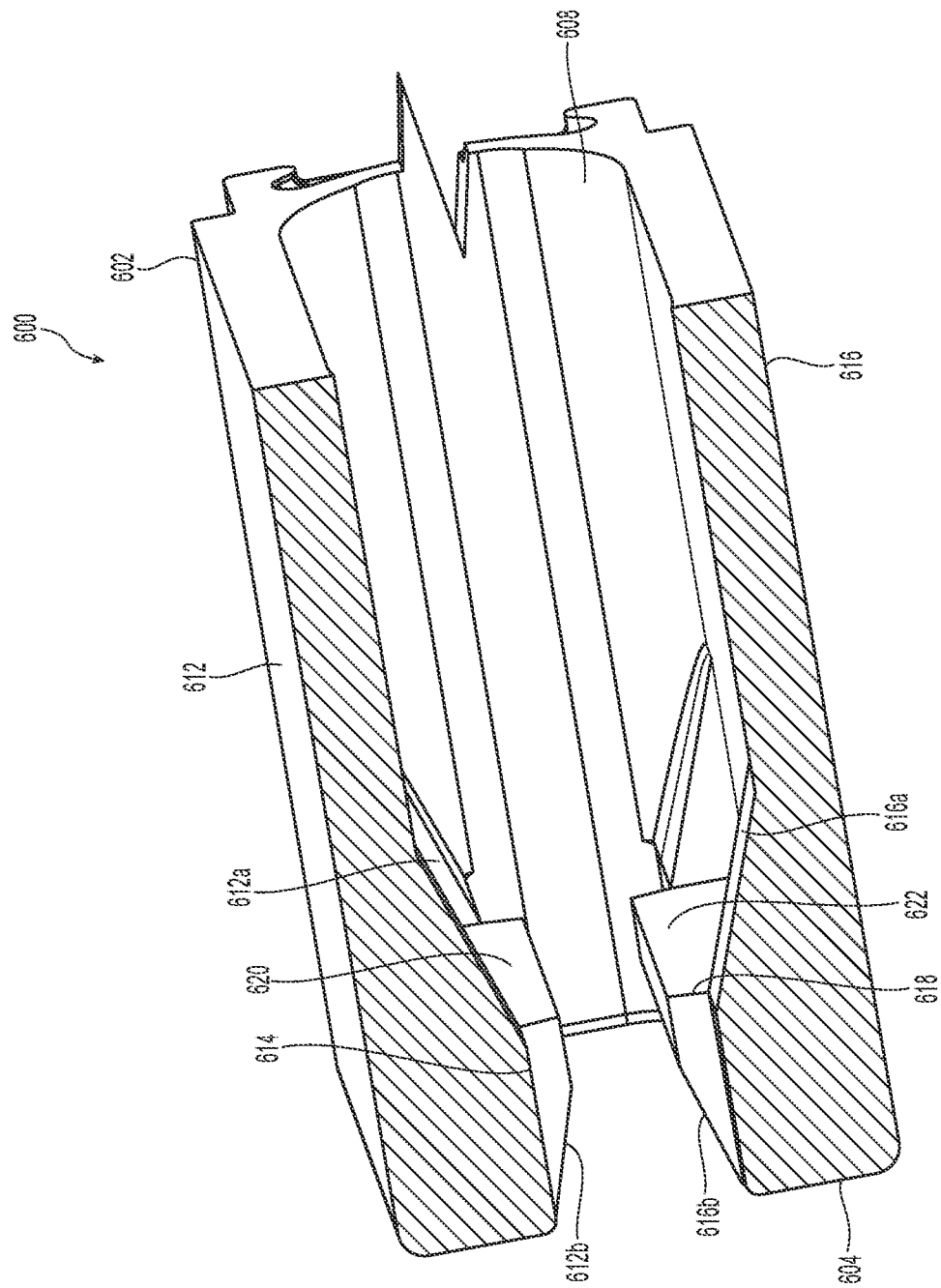
FIG. 37 is a perspective view of a cross section of the housing in FIG. 35 showing the front end thereof.
Figure 38:
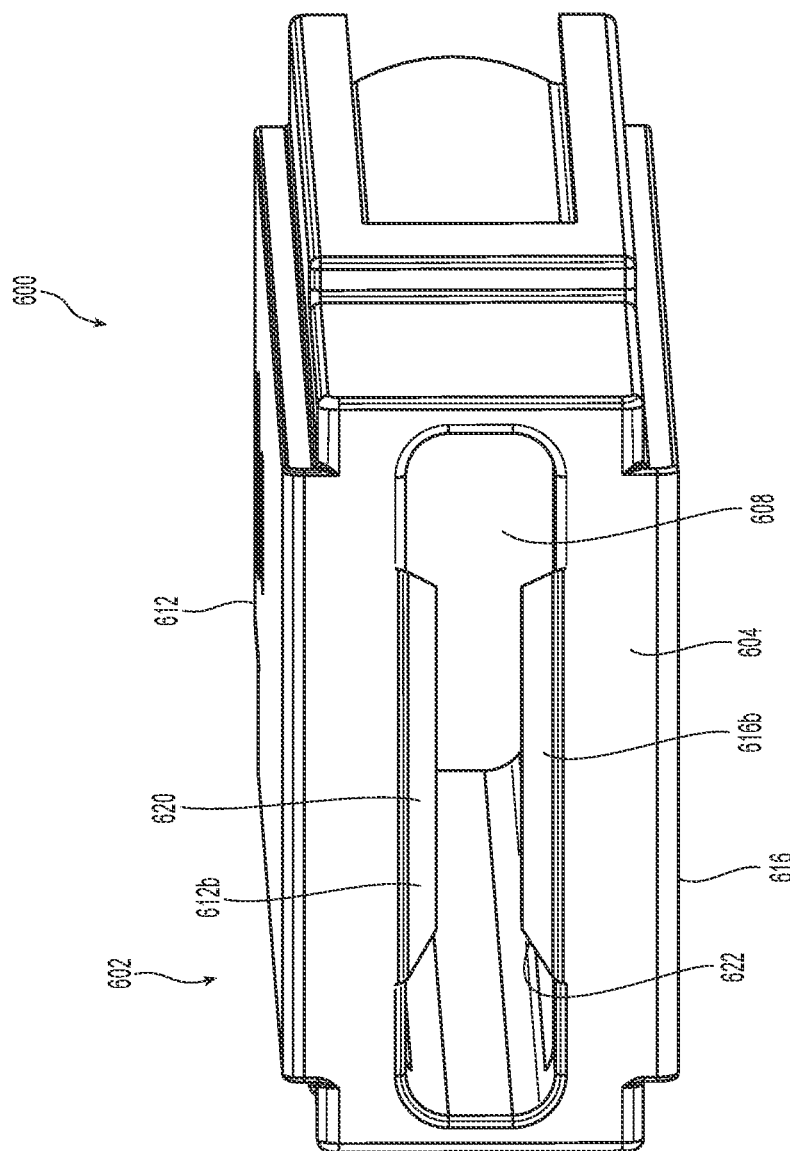
FIG. 38 is a perspective view of the housing in FIG. 35 without the multi-fiber ferrule installed.

Second side 210' also has a third tapered surface 210a' in the opening 216' as well as a fourth tapered surface 210b', the third tapered surface 210a' reducing the opening 216' between the rear end 206' and a second position 222', and the fourth tapered surface 210b' increasing the opening 216' between the second position 222' and the front end 204'. As can be seen in FIG. 34, the first position 220' and the second position 222' are directly across the opening 216' from each other. However, depending on the configuration of the cut-outs in the multi-fiber ferrule 100, the first position 220' and the second position 222' may be off set from one another. The first portion 220' and the second portion 222' can be thought of as a line (that may have a number of thicknesses) that extends across the opening 416' between the third side 212' and the fourth side 214' and on the first side 208' and the second side 210', respectively. However, as described with respect to the embodiments above, the first portion 220' and the second portion 222' can also be a plane rather than a line.

As with the prior embodiment, the fiber optic ferrule receiver 200' has a first projection 230' extending into the opening 216' from the first side 208' to engage the multi-fiber ferrule 100 at the first position 220'. Preferably the first projection 230' engages the first forward facing surface 132 of the multi-fiber ferrule 100. The ferrule receiver 200' has a second projection 240' extending into the opening 216' from the second side 210' to engage the multi-fiber ferrule 100' at the second position 222'. Preferably the second projection 240' engages the second forward facing surface 152 of the multi-fiber ferrule 100.

Turning to FIGS. 28-31, the other embodiment of the housing 406' will be explained. The housing 406' has a main body 420' that extends between a front end 422' and a rear end 426' and generally has three sections. The first section 428' is a front section that receives an elastic member such as spring 404. The second or middle section 470' provides an area for the optical fibers 300 to transition from a flat ribbon to a grouping that can be protected by a round fiber optic cable covering. The third or rear section 480' is used to finalize the configuration of the optical fibers from the transition area in the middle section 470' to the cable format. Except for the first section 428', the other sections are the same as discussed above and will not be repeated here.

The housing 406' also has an opening 426' that extends between the front end 422' and the rear end 424'. The first section 428' receives an elastic member such as spring 404. As noted above, the elastic member or spring 404 is to engage, directly or indirectly, the rear end of the multi-fiber ferrule 100 and bias it in a forward direction. The spring 404 engages forward facing surfaces 430' that extend into the opening 426' from the interior surface 432' and function as an integral spring stop. Referring to FIG. 31, two of the forward facing surfaces 430' are illustrated. The front end 422' has a chamfered surface 434' that assists in inserting the spring 404 during the initial insertion as well as movement of the spring 404 during use of the housing 406' in a fiber optic connector 400. The opening 426' is illustrated as being oval in cross section, but it could have other configurations as needed.

The main body 420' of the housing 406' has a plurality of shoulders 460' that extending from the front end 422' to the rear end 424'. The shoulders are generally at the corners of the main body 420', where first side 440' meets with top side 462' and bottom side 464' and second side 442' meets with top side 462' and bottom side 464'. These shoulders 460' act as a guide to align the fiber optic connector 400 with another receptacle, such as an adapter. The shoulders 460' also match with the shoulders on the both of the embodiments of fiber optic ferrule receiver to form a continuous shoulder at each corner.

At the front end 422' of the main body 420' and on both first side 440' and second side 442' is a depression 448' that also has the opening 444' to receive the projections 252' from the tabs 250' when the fiber optic ferrule receiver 200' is inserted into the opening 426'. There are also two pockets 436' that are closest to the top side 462' and bottom side 464' to receive a part of the ferrule and/or the guide pin keeper or spacer 402. See FIGS. 30 and 32.

Illustrated in FIGS. 35-38 is an embodiment of a combination of a housing and a fiber optic ferrule receiver according to the present invention. The housing 600 has a front section 602 that incorporates the features of the fiber optic ferrule receiver 200,200' above. The housing 600 has a front end 604 and a rear end 606 with an opening 608 extending therebetween. The housing 600 has a rear section 610 that receives the spring 404 from the rear end 606. As with other housings, the spring 404 engages the back of the multi-fiber ferrule 100, either directly or indirectly to bias it to the front of the housing 600.

The front section 602 has a first side 612 that has a first tapered surface 612a in the opening 608 as well as a second tapered surface 612b. See FIG. 37. As with the prior embodiments, the first tapered surface 612a reduces the opening 608 between the rear end 606 and a first position 614, and the second tapered surface 612b increasing the opening 608 between the first position 614 and the front end 604.

The front section 602 has a second side 616 that has a third tapered surface 616a in the opening 608 as well as a fourth tapered surface 616b. As with the prior embodiments, the third tapered surface 616a reduces the opening 608 between the rear end 606 and a second position 618, and the fourth tapered surface 616b increasing the opening 608 between the second position 618. and the front end 604.

The front section 602 also includes a first projection 620 that extends into the opening 608 from the first side 612 to engage the multi-fiber ferrule 100 at the first position 614. It also includes a second projection 622 that extends into the opening 608 from the second side 616 to engage the multi-fiber ferrule 100 at the second position 618. Thus, the elements of the fiber optic ferrule receiver have been incorporated into the housing and could, by extension, be added to other structures as well.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A housing for a fiber optic connector comprising:
    a main body with an opening extending between a front end and a rear end, wherein the main body has a top wall, a bottom wall, and two side walls on opposing sides of the main body to define the opening;
    a front section of the main body to receive an elastic member into the opening from the front end;
    a middle section of the main body to transition optical fibers between a fiber optic ferrule and a fiber optic cable;
    a rear section of the main body having an outer surface to engage a crimp ring, wherein the rear section has a first portion and a second portion, the second portion removably attachable to the first portion and forms a cylindrical outer surface with the first portion.

2. The housing for a fiber optic connector according to claim 1, wherein one of the first portion and the second portion have recesses and the other of the first portion and the second portion have extensions to engage the recesses.

3. The housing for a fiber optic connector according to claim 1, wherein the front section has forward facing surfaces in the opening to engage the elastic member.

4. The housing for a fiber optic connector according to claim 1, wherein the front section of the main body has a forward facing end face, the forward facing end face being non-perpendicular to a longitudinal axis extending through the opening from the front end to the rear end.

5. The housing for a fiber optic connector according to claim 1, wherein an outside surface of the main body has at least one depression to receive a portion of a fiber optic ferrule receiver therein.

6. The housing for a fiber optic connector according to claim 1, wherein the opening is elliptical and has a chamfer at the front end of the main body.

7. The housing for a fiber optic connector according to claim 1, further comprising a plurality of latch arms extending from the main body in a rearward direction and away from the front end.

8. The housing for a fiber optic connector according to claim 7, wherein the rear section of the main body extends beyond the plurality of latch arms.

9. The housing for a fiber optic connector according to claim 7, wherein the plurality of latch arms engage a portion of a push-pull boot.

10. The housing for a fiber optic connector according to claim 3, wherein the elastic member is a spring and the extends from the opening and beyond the front end of the housing.

11. The housing for a fiber optic connector according to claim 2, wherein the second portion of the rear end creates asymmetric portion of the opening at the rear end.

12. The housing for a fiber optic connector according to claim 7, wherein the rear section has a first portion and a second portion, the second portion removably attachable to the first portion and further comprising a latch arm that is attached to the second portion of the rear section.

13. A housing for a fiber optic connector comprising:
    a main body with an opening extending between a front end and a rear end, and having an integral spring stop surface between the front end and the rear end;
    a front section of the main body to receive an elastic member into the opening from the front end and engageable with the integral spring stop of the housing;
    a middle section of the main body to transition optical fibers between a fiber optic ferrule and a fiber optic cable;

a rear section of the main body having an outer surface to engage a crimp ring, wherein the rear section has a first portion and a second portion, the second portion removably attachable to the first portion and forms a cylindrical outer surface with the first portion.

\* \* \* \* \*

UNITED STATES PATENT AND TRADEMARK OFFICE
CERTIFICATE OF CORRECTION

PATENT NO. : 12,061,362 B2
APPLICATION NO. : 17/918067
DATED : August 13, 2024
INVENTOR(S) : Jason Higley et al.

Page 1 of 1

It is certified that error appears in the above-identified patent and that said Letters Patent is hereby corrected as shown below:

In the Claims

Column 14, Line 47, delete second occurrence of "the".

Signed and Sealed this
Twenty-sixth Day of November, 2024

Katherine Kelly Vidal
*Director of the United States Patent and Trademark Office*